US008814308B2

(12) United States Patent
Wakui

(10) Patent No.: US 8,814,308 B2
(45) Date of Patent: Aug. 26, 2014

(54) IMAGE FORMING APPARATUS AND IMAGE FORMING METHOD

(71) Applicant: FUJIFILM Corporation, Tokyo (JP)

(72) Inventor: Takashi Wakui, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 10 days.

(21) Appl. No.: 13/724,352

(22) Filed: Dec. 21, 2012

(65) Prior Publication Data

US 2013/0182027 A1 Jul. 18, 2013

(30) Foreign Application Priority Data

Jan. 17, 2012 (JP) ................................ 2012-007058

(51) Int. Cl.
*B41J 2/21* (2006.01)

(52) U.S. Cl.
USPC ......... 347/15; 347/12; 347/9; 347/40; 347/43

(58) Field of Classification Search
USPC .............................. 347/12, 15, 40, 41, 43, 45
See application file for complete search history.

(56) References Cited

U.S. PATENT DOCUMENTS

| | | | | |
|---|---|---|---|---|
| 4,371,274 | A * | 2/1983 | Jaeger | 400/306 |
| 4,739,415 | A * | 4/1988 | Toyono et al. | 358/296 |
| 6,257,685 | B1 | 7/2001 | Ishikawa | |
| 6,270,181 | B1 * | 8/2001 | Ota | 358/3.02 |
| 6,328,395 | B1 * | 12/2001 | Kitahara et al. | 347/9 |
| 6,328,400 | B1 * | 12/2001 | Yonekubo et al. | 347/15 |
| 6,602,003 | B2 * | 8/2003 | Kakutani | 400/76 |
| 6,960,037 | B2 * | 11/2005 | Kojima et al. | 400/582 |
| 7,246,869 | B2 * | 7/2007 | Tanaka et al. | 347/16 |
| 7,275,801 | B2 | 10/2007 | Chiwata | |
| 7,369,267 | B2 * | 5/2008 | Fagan et al. | 358/1.2 |
| 7,585,041 | B2 * | 9/2009 | Kakutani et al. | 347/15 |
| 7,588,305 | B2 * | 9/2009 | Knierim et al. | 347/14 |
| 7,686,407 | B2 * | 3/2010 | Usui | 347/9 |
| 8,023,151 | B2 | 9/2011 | Kakutani | |
| 8,596,748 | B2 * | 12/2013 | Itogawa | 347/21 |
| 8,672,438 | B2 * | 3/2014 | Sudo et al. | 347/15 |
| 2004/0057770 | A1 * | 3/2004 | Kojima et al. | 400/582 |
| 2005/0219287 | A1 * | 10/2005 | Tatsumi | 347/9 |
| 2005/0237348 | A1 * | 10/2005 | Campbell | 347/6 |
| 2007/0057985 | A1 | 3/2007 | Saito et al. | |
| 2009/0066744 | A1 * | 3/2009 | Sano et al. | 347/15 |
| 2010/0165032 | A1 * | 7/2010 | Yoshida | 347/15 |
| 2012/0212534 | A1 * | 8/2012 | Tanase et al. | 347/15 |

FOREIGN PATENT DOCUMENTS

| | | | |
|---|---|---|---|
| EP | 0 979 732 | A1 | 2/2000 |
| EP | 1 040 925 | A2 | 10/2000 |

(Continued)

OTHER PUBLICATIONS

Extended European Search Report dated Jun. 25, 2014, issued in corresponding European Patent Application No. 12196547.9.

*Primary Examiner* — Matthew Luu
*Assistant Examiner* — Lily Kemathe
(74) *Attorney, Agent, or Firm* — Birch, Stewart, Kolasch & Birch, LLP

(57) ABSTRACT

Ink droplets are ejected from a plurality of dot forming elements arranged along an array direction to form dots of at least two sizes on a recording medium. If the dots formed along the array direction are classified into a plurality of groups depending on a plurality of times, the existing ratio of dots of a smaller one of the at least two sizes is higher for one of the groups of an earlier time of the times.

9 Claims, 22 Drawing Sheets

(56) References Cited

FOREIGN PATENT DOCUMENTS

| | | | |
|---|---|---|---|
| JP | 59-232877 | A | 12/1984 |
| JP | 2005-313635 | A | 11/2005 |
| JP | 2006-21387 | A | 1/2006 |
| JP | 2007-142850 | A | 6/2007 |
| JP | 2007-168201 | A | 7/2007 |
| JP | 2011-207175 | A | 10/2011 |

* cited by examiner

EJECTION SEQUENCE OVER ENTIRE IMAGE

| | a | b | c | d | e | f | g | h | i | j | k | l |
|---|---|---|---|---|---|---|---|---|---|---|---|---|
| A | 1 | 2 | 3 | 4 | 1 | 2 | 3 | 4 | 1 | 2 | 3 | 4 |
| B | 2 | 3 | 4 | 5 | 2 | 3 | 4 | 5 | 2 | 3 | 4 | 5 |
| C | 3 | 4 | 5 | 6 | 3 | 4 | 5 | 6 | 3 | 4 | 5 | 6 |

EJECTION SEQUENCE ALONG ARRAY DIRECTION

| | a | b | c | d | e | f | g | h | i | j | k | l |
|---|---|---|---|---|---|---|---|---|---|---|---|---|
| A | 1 | 2 | 3 | 4 | 1 | 2 | 3 | 4 | 1 | 2 | 3 | 4 |
| B | 1 | 2 | 3 | 4 | 1 | 2 | 3 | 4 | 1 | 2 | 3 | 4 |
| C | 1 | 2 | 3 | 4 | 1 | 2 | 3 | 4 | 1 | 2 | 3 | 4 |

EJECTION SEQUENCE OVER ENTIRE IMAGE

| | a | b | c | d | e | f | g | h | i | j | k | l |
|---|---|---|---|---|---|---|---|---|---|---|---|---|
| A | 1 | 3 | 2 | 4 | 1 | 3 | 2 | 4 | 1 | 3 | 2 | 4 |
| B | 2 | 4 | 3 | 5 | 2 | 4 | 3 | 5 | 2 | 4 | 3 | 5 |
| C | 3 | 5 | 4 | 6 | 3 | 5 | 4 | 6 | 3 | 5 | 4 | 6 |

EJECTION SEQUENCE ALONG ARRAY DIRECTION

| | a | b | c | d | e | f | g | h | i | j | k | l |
|---|---|---|---|---|---|---|---|---|---|---|---|---|
| A | 1 | 3 | 2 | 4 | 1 | 3 | 2 | 4 | 1 | 3 | 2 | 4 |
| B | 1 | 3 | 2 | 4 | 1 | 3 | 2 | 4 | 1 | 3 | 2 | 4 |
| C | 1 | 3 | 2 | 4 | 1 | 3 | 2 | 4 | 1 | 3 | 2 | 4 |

FIG. 20A

EJECTION SEQUENCE OVER ENTIRE IMAGE

| | a | b | c | d | e | f | g | h | i | j | k | l | m | n | o | p |
|---|---|---|---|---|---|---|---|---|---|---|---|---|---|---|---|---|
| A | 0 | 1 | 2 | 3 | 4 | 5 | 6 | 7 | 0 | 1 | 2 | 3 | 4 | 5 | 6 | 7 |
| B | 1 | 2 | 3 | 4 | 5 | 6 | 7 | 8 | 1 | 2 | 3 | 4 | 5 | 6 | 7 | 8 |
| C | 2 | 3 | 4 | 5 | 6 | 7 | 8 | 9 | 2 | 3 | 4 | 5 | 6 | 7 | 8 | 9 |

EJECTION SEQUENCE ALONG ARRAY DIRECTION

| | a | b | c | d | e | f | g | h | i | j | k | l | m | n | o | p |
|---|---|---|---|---|---|---|---|---|---|---|---|---|---|---|---|---|
| A | 1 | 2 | 3 | 4 | 5 | 6 | 7 | 8 | 1 | 2 | 3 | 4 | 5 | 6 | 7 | 8 |
| B | 1 | 2 | 3 | 4 | 5 | 6 | 7 | 8 | 1 | 2 | 3 | 4 | 5 | 6 | 7 | 8 |
| C | 1 | 2 | 3 | 4 | 5 | 6 | 7 | 8 | 1 | 2 | 3 | 4 | 5 | 6 | 7 | 8 |

FIG. 20B

EJECTION SEQUENCE OVER ENTIRE IMAGE

| | a | b | c | d | e | f | g | h | i | j | k | l | m | n | o | p |
|---|---|---|---|---|---|---|---|---|---|---|---|---|---|---|---|---|
| A | 0 | 2 | 1 | 3 | 4 | 5 | 6 | 7 | 0 | 2 | 1 | 3 | 4 | 5 | 6 | 7 |
| B | 1 | 3 | 2 | 4 | 5 | 7 | 6 | 8 | 1 | 3 | 2 | 4 | 5 | 7 | 6 | 8 |
| C | 2 | 4 | 3 | 5 | 6 | 8 | 7 | 9 | 2 | 4 | 3 | 5 | 6 | 8 | 7 | 9 |

EJECTION SEQUENCE ALONG ARRAY DIRECTION

| | a | b | c | d | e | f | g | h | i | j | k | l | m | n | o | p |
|---|---|---|---|---|---|---|---|---|---|---|---|---|---|---|---|---|
| A | 1 | 3 | 2 | 4 | 5 | 7 | 6 | 8 | 1 | 3 | 2 | 4 | 5 | 7 | 6 | 8 |
| B | 1 | 3 | 2 | 4 | 5 | 7 | 6 | 8 | 1 | 3 | 2 | 4 | 5 | 7 | 6 | 8 |
| C | 1 | 3 | 2 | 4 | 5 | 7 | 6 | 8 | 1 | 3 | 2 | 4 | 5 | 7 | 6 | 8 |

IMAGE FORMING APPARATUS AND IMAGE FORMING METHOD

CROSS-REFERENCE TO RELATED APPLICATION

This application is based upon and claims the benefit of priority from Japanese Patent Application No. 2012-007058 filed on Jan. 17, 2012, the contents of which are incorporated herein by reference.

BACKGROUND OF THE INVENTION

1. Field of the Invention

The present invention relates to an image forming apparatus and an image forming method for producing an image by forming dots having two or more sizes on a recording medium.

2. Description of the Related Art

With the significant advances in the inkjet technology in recent years, it has been becoming possible for inkjet printers to produce large color prints of high quality at high speeds. The inkjet printers are widely used particularly in sign and display applications, and are applicable to the printing of POP (Point Of Purchase) posters, wall posters, outdoor advertisements, and billboards, etc., for example. The inkjet printers are capable of producing prints by ejecting droplets of a plurality of types of inks, e.g., inks in C (cyan), M (magenta), Y (yellow), and K (black), onto a print medium (recording medium) to form a number of dots thereon.

Attempts made in connection to the inkjet printers to speed up the formation images and increase the density of dots tend to cause problems due to an interference between landed ink droplets. The interference between landed ink droplets refers to a phenomenon wherein in a state where an earlier droplet that has previously landed on a recording medium has not yet been fully absorbed in the recording medium, a subsequent droplet lands on the recording medium near the unabsorbed portion of the earlier droplet and unites the earlier droplet. If the interference between landed ink droplets occurs, the liquid inks of the droplets shift toward each other due to their surface tension. As a consequence, the position of the center of gravity of a dot formed on the recording medium by the subsequent droplet is shifted, resulting in a reduction of the quality of an image formed on the recording medium.

Accordingly, various inkjet printers have been proposed to form high-quality images by appropriately controlling a recording head (dot forming unit) to eject ink droplets in view of adverse effects of the interference between landed ink droplets.

Japanese Laid-Open Patent Publication No. 2005-313635 discloses a method of and an apparatus for controlling ejection of ink droplets such that the ink droplets are ejected successively from a recording head toward a recording medium in progressively greater quantities. The ink droplets that are ejected in progressively greater quantities from the recording head are effective to form a line having a uniform width on the recording medium even in the event of an interference between landed ink droplets.

SUMMARY OF THE INVENTION

It is an object of the present invention to provide an image forming apparatus and an image forming method that are capable of minimizing a reduction of the quality of an image formed on a recording medium due to an interference between landed ink droplets, in reference to the technical concept disclosed in Japanese Laid-Open Patent Publication No. 2005-313635.

According to the present invention, there is provided an image forming apparatus comprising a dot former including a plurality of dot forming elements arranged along an array direction for ejecting droplets to form dots of at least two sizes on a recording medium, a dot formation controller for controlling the dot former based on a control signal supplied to the dot formation controller, to form the dots successively at a plurality of times to generate image arrays along the array direction while the dot former and the recording medium are being moved relatively to each other, and a signal converter for converting an input image signal into the control signal supplied to the dot formation controller such that if the dots formed along the array direction are classified into a plurality of groups depending on the plurality of times, the existing ratio of dots of a smaller one of the at least two sizes is higher for one of the groups of an earlier time of the times.

As described above, if the dots formed along the array direction are classified into a plurality of groups depending on the plurality of times, the existing ratio of dots of a smaller one of the at least two sizes is higher for one of the groups of an earlier time of the times. Accordingly, adverse physical effects due to an interference between landed ink droplets are reduced, and the shape of dots formed by landed ink droplets can be appropriately controlled.

With respect to each of the image arrays along the array direction, the amount of a first droplet to be firstly ejected is relatively reduced, or stated otherwise, the size of a first dot formed at an early time is relatively reduced. Consequently, in a case where a subsequent second droplet is landed, the remaining amount of the early first droplet that exists on the sheet is minimized. The transfer amount of the subsequent second droplet which transfers toward the first droplet is thus reduced, and hence any positional shift of the second dot that is formed at a later time is reduced. As a result, deterioration of the quality of an image formed by the dots on the sheet due to a landed ink droplet interference is minimized.

The signal converter should preferably include a halftoning processor for performing a halftoning process on a continuous-tone image signal depending on the input image signal to acquire a multivalued image signal having fewer gradation levels than the continuous-tone image signal.

The signal converter should preferably include a gradation processor for performing a gradation process depending on the classified groups on the input image signal, thereby to generate the continuous-tone image signal in which the existing ratio of dots of the smaller one of the at least two sizes is higher for the one of the groups of the earlier time of the times.

The multivalued image signal should preferably comprise a binary image signal selectively representative of on and off states of the dots, and the signal converter should preferably further include a dot size allocator for allocating the at least two sizes to the binary image signal acquired by the halftoning processor for thereby generating the control signal in which the existing ratio of dots of the smaller one of the at least two sizes is higher for the one of the groups of the earlier time of the times.

The halftoning processor should preferably convert the input image signal into the control signal according to an ordered dither method, using a threshold matrix having dot dispersion characteristics in which the existing ratio of dots of the smaller one of the at least two sizes is higher for the one of the groups of the earlier time of the times.

The threshold matrix should preferably have a size which is an integral multiple of the number of times required to generate each of the image arrays.

The signal converter should preferably include a processing condition setting section for setting a process for classifying the plurality of groups and/or an existing ratio of the dots as a processing condition for converting the input image signal into the control signal.

The image forming apparatus should preferably further comprise at least one dot former for forming dots which are of the same color as the dots formed by the first-mentioned dot former on the recording medium.

According to the present invention, there is also provided an image forming method using an image forming apparatus including a dot former including a plurality of dot forming elements arranged along an array direction for ejecting droplets to form dots of at least two sizes on a recording medium, and a dot formation controller for controlling the dot former based on a control signal supplied to the dot formation controller, to form the dots successively at a plurality of times to generate image arrays along the array direction while the dot former and the recording medium are being moved relatively to each other, the image forming method comprising the steps of inputting an image signal, converting the input image signal into the control signal such that if the dots formed along the array direction are classified into a plurality of groups depending on the plurality of times, the existing ratio of dots of a smaller one of the at least two sizes is higher for one of the groups of an earlier time of the times, and controlling the dot forming elements based on the converted control signal.

With the image forming apparatus and the image forming method according to the present invention, if the dots formed along the array direction are classified into a plurality of groups depending on the plurality of times, the existing ratio of dots of a smaller one of the at least two sizes is higher for one of the groups of an earlier time of the times. Accordingly, adverse physical effects due to an interference between landed ink droplets are reduced, and the shape of dots formed by landed ink droplets can be appropriately controlled.

Specifically, with respect to each of the image arrays along the array direction, the amount of a first droplet to be firstly ejected is relatively reduced, or stated otherwise, the size of a first dot formed at an early time is relatively reduced. Consequently, in a case where a subsequent second droplet is landed, the remaining amount of the early first droplet that exists on the sheet is minimized. The transfer amount of the subsequent second droplet which transfers toward the first droplet is thus reduced, and hence any positional shift of the second dot that is formed at a late time is reduced. As a result, deterioration of the quality of an image formed by the dots on the sheet due to a landed ink droplet interference is minimized.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 20A is a schematic diagram showing sequences of ejection of ink droplets, which correspond to respective image positions, ejected from the nozzles in the layout example shown in FIG. 3;

FIG. 20B is a schematic diagram showing sequences of ejection of ink droplets, which correspond to respective image positions, ejected from the nozzles in the layout example shown in FIG. 15A;

DESCRIPTION OF THE PREFERRED EMBODIMENTS

Image forming methods according to preferred embodiments of the present invention in relation to image forming apparatus for carrying out the image forming methods will be described below with reference to the accompanying drawings. In the description which follows, the formation of an image will also be referred to as "printing".

First Embodiment

An image forming apparatus 10 according to a first embodiment of the present invention will be described below with reference to FIGS. 1 through 14.

Figure 1:
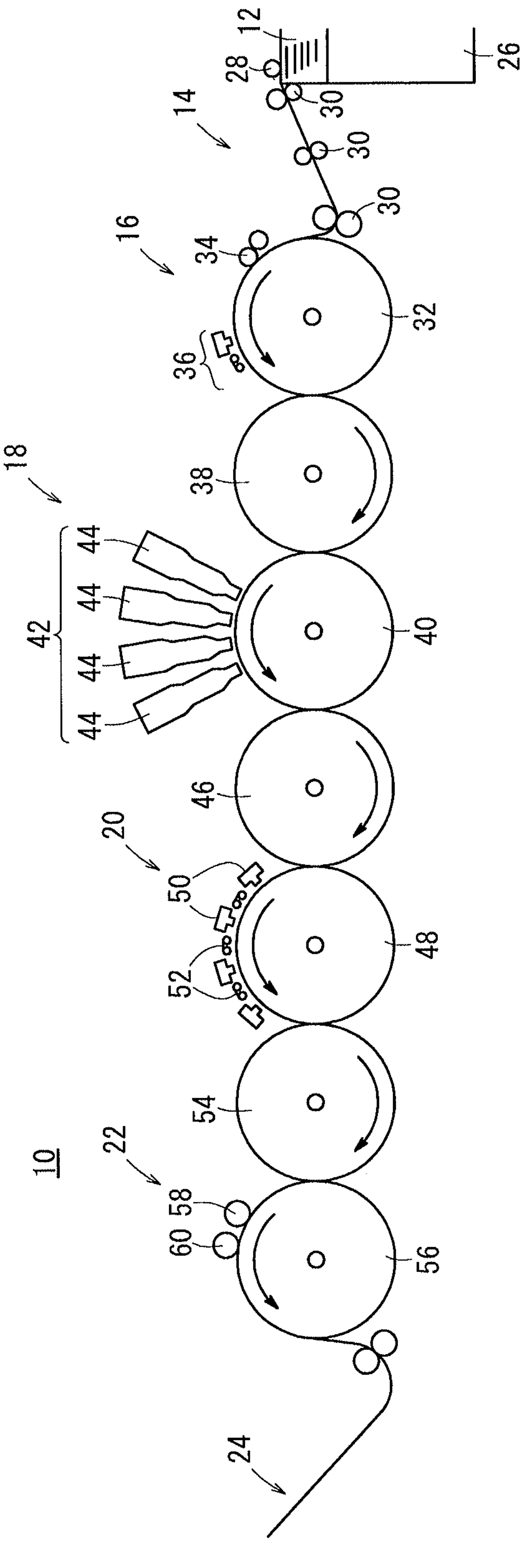
FIG. 1 is a sectional side elevational view of an image forming apparatus according to a first embodiment of the present invention.

As shown in FIG. 1, the image forming apparatus 10 has a sheet delivery system including a sheet feeding assembly 14 for feeding sheets 12 as recording mediums. The sheet feeding assembly 14 is positioned at an upstream end of the sheet delivery system with respect to the direction along which the sheets 12 are fed through the image forming apparatus 10 (sheet feeding direction). The image forming apparatus 10 also includes, in the sheet delivery system, a processing solution coater 16 for coating the recording surface (hereinafter referred to as "image forming surface") of each sheet 12 with a processing solution, an image former 18 for applying inks or coloring materials to the processing solution layer on the image forming surface of the sheet 12, an ink drier 20 for drying the inks in the processing solution layer on the sheet 12, an image fixer 22 for fixing an image in the processing solution layer to the sheet 12, and a sheet discharger 24 for discharging the sheet 12 with the fixed image. The processing solution coater 16, the image former 18, the ink drier 20, the image fixer 22, and the sheet discharger 24 are arranged successively along the sheet feeding direction downstream of the sheet feeding assembly 14.

The sheet feeding assembly 14 has a sheet stacker 26 for stacking sheets 12 therein, a sheet supplier 28 for supplying one sheet 12 at a time from the sheet stacker 26, and a sheet feeder 30 for feeding the sheet 12 supplied by the sheet supplier 28 to the processing solution coater 16.

The processing solution coater 16 has a rotatable processing solution coating drum 32, a processing solution coating device 34 for coating the image forming surface of the sheet 12 with the processing solution, and a processing solution drying device 36 for drying the applied processing solution. The processing solution coater 16 applies a coating solution layer in the form of a thin film on the image forming surface of the sheet 12.

A first intermediate feed drum 38 is rotatably disposed between the processing solution coater 16 and the image former 18. The first intermediate feed drum 38 is rotated about its own axis with the sheet 12 held on its circumferential surface, thereby feeding the sheet 12 supplied from the processing solution coater 16 to the image former 18.

The image former 18 has a rotatable image forming drum 40 (feeder) and a head unit 42 for ejecting ink droplets onto the sheet 12 that is fed by the image forming drum 40. The head unit 42 includes four line heads 44 (dot formers) in at least basic colors, i.e., Y (yellow), M (magenta), C (cyan), and K (black). The line heads 44 are arranged along the circumferential directions of the image forming drum 40. The line heads 44 thus arranged successively form images in the respective colors on the processing solution layer applied onto the image forming surface of the sheet 12. The processing solution is effective to coagulate color materials (pigments) and latex particles that are dispersed in the solvents of the inks. Therefore, the processing solution can prevent the color materials from flowing on the sheet 12.

A second intermediate feed drum 46 is rotatably disposed between the image former 18 and the ink drier 20. The second intermediate feed drum 46 is rotated about its own axis with the sheet 12 held on its circumferential surface, thereby feeding the sheet 12 supplied from the image former 18 to the ink drier 20.

The ink drier 20 has a rotatable ink drying drum 48, a plurality of hot air nozzles 50 for drying the processing solution layer on the sheet 12, and a plurality of infrared heaters 52. The ink drier 20 dries off the solvent of the inks that stay in the processing solution layer on the sheet 12.

A third intermediate feed drum 54 is rotatably disposed between the ink drier 20 and the image fixer 22. The third intermediate feed drum 54 is rotated about its own axis with the sheet 12 held on its circumferential surface, thereby feeding the sheet 12 supplied from the ink drier 20 to the image fixer 22.

The image fixer 22 has a rotatable image fixing drum 56, a heating roller 58 disposed closely to the circumferential surface of the image fixing drum 56, and a fixing roller 60 pressed against the circumferential surface of the image fixing drum 56. The image fixer 22 heats and presses the latex particles coagulated by the processing solution to melt the latex particles, thereby fixing them as an image on the sheet 12.

The image fixing drum 56 continuously rotates about its own axis, whereby the sheet 12 with the image fixed onto its image forming surface by the above processes performed by the image forming apparatus 10 is then fed into the discharger 24 that is positioned downstream of the image fixer 22.

Figure 2:
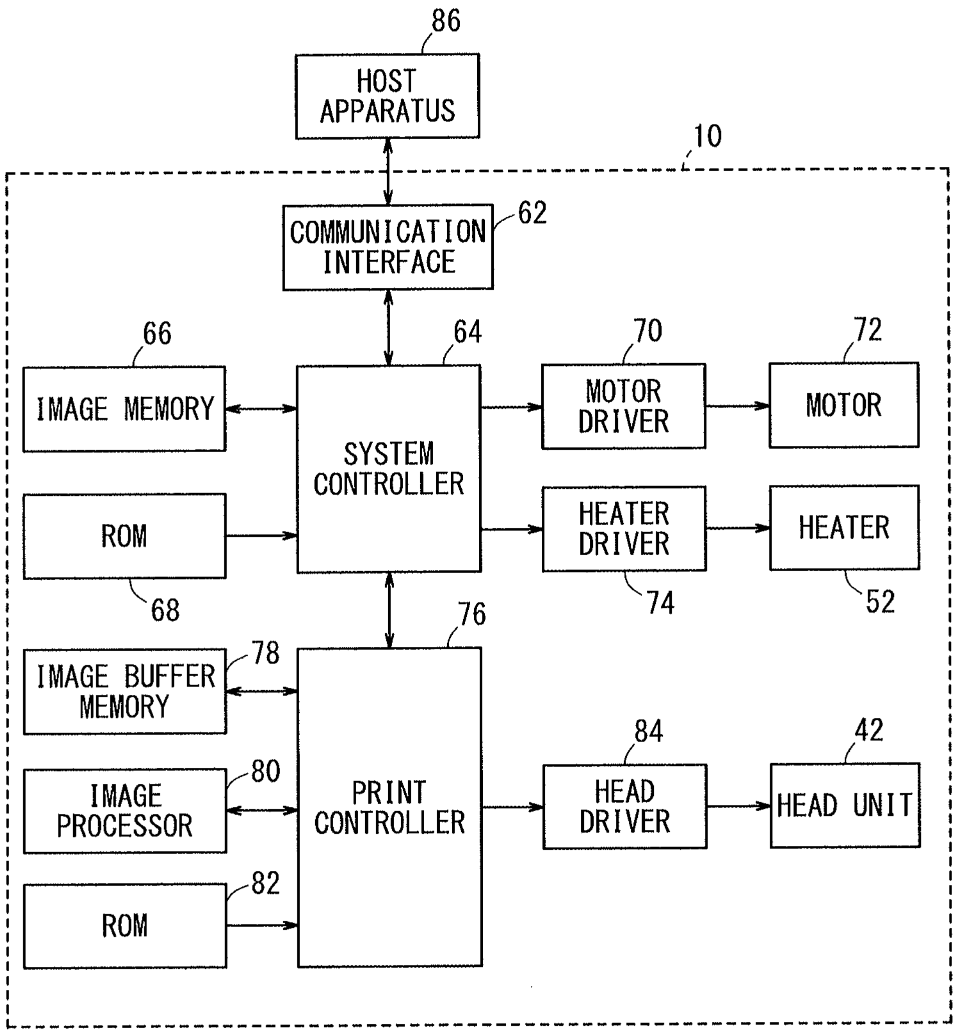
FIG. 2 is a block diagram showing a system arrangement of the image forming apparatus shown in FIG. 1.

FIG. 2 is a block diagram showing a system arrangement of the image forming apparatus 10 shown in FIG. 1. As shown in FIG. 2, the system arrangement of the image forming apparatus 10 includes, in addition to the head unit 42 and the heaters 52 (see FIG. 1), a communication interface 62, a system controller 64, an image memory 66, a ROM 68, a motor driver 70, a motor 72, a heater driver 74, a print controller 76, an image buffer memory 78, an image processor 80 (signal converter), a ROM 82, and a head driver 84 (dot formation controller).

The communication interface 62 is an interface with a host apparatus 86 which is used by the user to enter instructions for forming an image into the image forming apparatus 10. The communication interface 62 may comprise a serial interface such as a USB (Universal Serial Bus) terminal, an IEEE 1394 terminal, an Ethernet (registered trademark) terminal, a wireless network terminal, or the like, or a parallel interface such as a Centronics interface or the like. The communication interface 62 may incorporate a buffer memory, not shown, for achieving a higher communication rate.

An image signal supplied from the host apparatus 86 is read through the communication interface 62 into the image forming apparatus 10, wherein the image signal is temporarily stored in the image memory 66. The image memory 66 is a storage means for storing the image signal input through the communication interface 62. The image signal is written into and read out of the image memory 66 through the system controller 64. The image memory 66 may comprise a semiconductor memory or a magnetic medium such as a hard disk or the like.

The system controller 64, which comprises a central processing unit (CPU) and peripheral circuits, functions as a controller for controlling the image forming apparatus 10 in its entirety according to prescribed programs and also as a processor for performing various processing operations. Specifically, the system controller 64 controls various components including the communication interface 62, the image memory 66, the motor driver 70, the heater driver 74, etc. The system controller 64 also controls communications with the host apparatus 86 and the writing and reading of data into and out of the image memory 66 and the ROM 68. The system controller 64 generates control signals for controlling the motor 72 and the heaters 52 of the sheet delivery system. The system controller 64 sends control signals and also the image signal stored in the image memory 66 to the print controller 76.

The ROM 68 stores programs to be executed by the CPU of the system controller 64 and various data required thereby to carry out various control processes. The image memory 66 is used as a temporary storage area for temporarily storing the image signal and also as a storage area for storing the programs and a working area for storing data processed by the CPU of the system controller 64.

The motor driver 70 is a drive circuit for energizing the motor 72 according to commands from the system controller 64. The heater driver 74 is a drive circuit for energizing the heaters 52 according to commands from the system controller 64.

The print controller 76, which comprises a CPU and peripheral circuits, is controlled by the system controller 64 to cooperate with the image processor 80 in performing various processing and correcting processes for generating ink droplet ejection control signals from the image signal stored in the image memory 66, and also to supply the generated ink droplet ejection control signals, i.e., ink droplet ejection data, to the head driver 84 to control the head units 42 to eject ink droplets.

The print controller 76 is connected to the ROM 82 which stores programs to be executed by the CPU of the print controller 76 and various data required thereby to carry out various control processes. Though the ROM 82 may be a nonrewritable storage means, it should preferably be a rewritable storage means such as an EEPROM if various data stored therein need to be updated when necessary.

The image processor 80 generates dot layout data for different ink colors from an image signal input thereto (hereinafter referred to as "input image signal"). Specifically, the image processor 80 performs a halftoning process on the input image signal to determine positions where dots are to be formed, i.e., ink ejection timings. The halftoning process may be an ordered dither method, an error diffusion method, a density pattern method, a random dot method, or the like.

In FIG. 2, the image processor 80 is shown as separate from the system controller 64 and the print controller 76. However, the image processor 80 may be included in the system controller 64 or the print controller 76 as part thereof.

The print controller 76 has an ink droplet ejection data generating function to generate ink droplet ejection data, i.e., control signals for actuators corresponding to nozzles of the line heads 44, based on the dot layout data generated by the image processor 80, and also has a drive waveform generating function.

The ink droplet ejection data that are generated by the ink droplet ejection data generating function are supplied to the head driver 84, which controls the head unit 42 to eject ink droplets. The drive waveform generating function is a function to generate drive signal waveforms for driving the actuators corresponding to the nozzles of the line heads 44. Signals, i.e., drive waveforms, generated by the drive waveform generating function are supplied to the head driver 84, which appropriately controls amounts of ejected ink droplets to produce dots having two or more sizes (hereinafter referred to as "dot sizes").

The print controller 76 is connected to the image buffer memory 78 which temporarily stores an image signal and data such as parameters if the print controller 76 processes the image signal.

Figure 3:
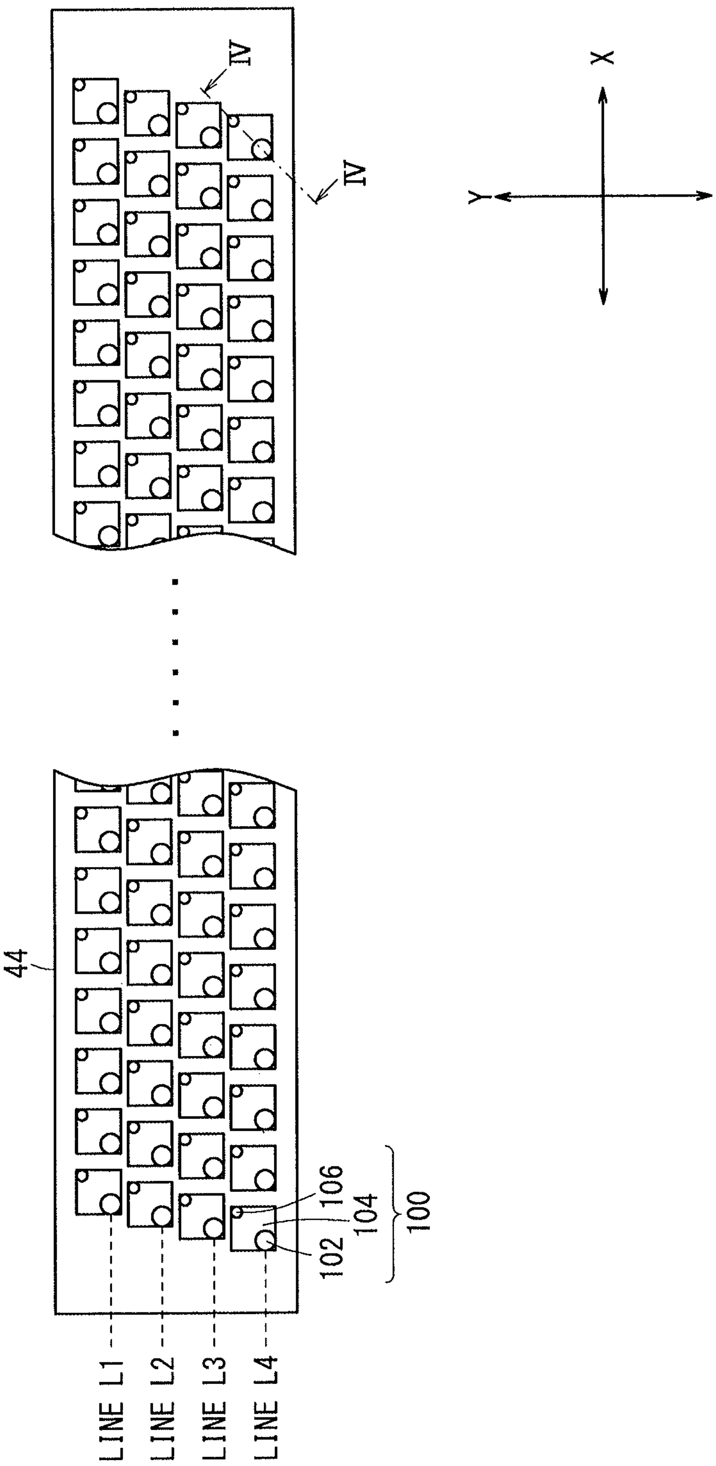
FIG. 3 is a fragmentary plan view showing a configurational example of a line head shown in FIG. 1.
Figure 4:
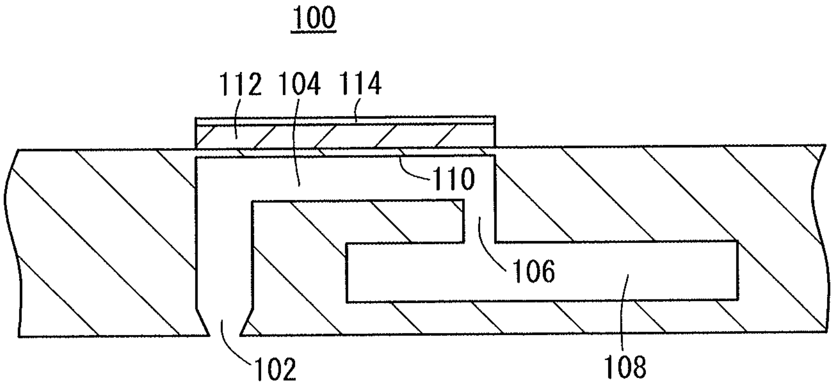
FIG. 4 is a cross-sectional view taken along line IV-IV of FIG. 3.

FIG. 3 is a fragmentary plan view showing a configurational example of each of the line heads 44 shown in FIG. 1. FIG. 4 is a cross-sectional view taken along line IV-IV of FIG. 3.

As shown in FIG. 3, the line head 44 has a plurality of ink chamber units 100 (dot forming elements) arranged in a staggered matrix. Each of the ink chamber units 100 comprises a nozzle 102, a pressure chamber 104, and a supply port 106. The pressure chamber 104, which is of a substantially square planar shape, has an outlet to the nozzle 102 and defined in one of diagonally opposite corners thereof, and an inlet (supply port 106) from a common channel 108 and defined in the other of diagonally opposite corners (see FIG. 4).

As shown in FIG. 4, the pressure chamber 104 is held in fluid communication with the common channel 108 through the supply port 106. The common channel 108 is held in fluid communication with an ink tank, not shown, as an ink supply source. An ink supplied from the ink tank is distributed and supplied to each pressure chamber 104 through the common channel 108.

The pressure chamber 104 has an upper wall constructed as a pressurization plate 110, which doubles as a common electrode. A piezoelectric element 112 as an actuator for pressing the pressurization plate 110 to deform the same is joined to an upper surface of the pressurization plate 110. An individual electrode 114 is disposed on the upper surface of the piezoelectric element 112.

If a drive voltage is applied between the pressurization plate 110 serving as the common electrode and the individual electrode 114, the piezoelectric element 112 which is sandwiched between these two electrodes is deformed, thereby changing the volume of the pressure chamber 104 to force the ink out of the nozzle 102 to the outside and eject (discharge) the ink as an ink droplet. After the ink droplet is ejected, the drive voltage is removed to allow the piezoelectric element 112 to return to its original position, and then the pressure chamber 104 is refilled with the ink flowing from the common channel 108 through the supply port 106.

The layout of the nozzles 102 will be described below with reference to FIG. 3. The line head 44 shown in FIG. 3 has a longitudinal direction defined as an X direction and a transverse direction defined as a Y direction. The sheet feeding direction (see FIG. 1) is transverse (normal) to the X direction, and parallel to the Y direction.

The nozzles 102 are arranged along a plurality of lines including a line L1, a line L2, a line L3, and a line L4. The nozzles 102 along the line L1 are spaced at equal intervals, each corresponding to four unit lengths, along the X direction. The nozzles 102 along the lines L2 through L4 are arranged in the same manner as the nozzles 102 along the line L1. The X direction will hereinafter also be referred to as "array direction" of the nozzles 102, i.e., the ink chamber units 100.

The nozzles 102 along the line L2 are disposed in respective positions that are shifted by one unit length from the corresponding nozzles 102 along the line L1 to the left along the X direction. The nozzles 102 along the line L3 are disposed in respective positions that are shifted by one unit length from the corresponding nozzles 102 along the line L2 to the left along the X direction. The nozzles 102 along the line L4 are disposed in respective positions that are shifted by one unit length from the corresponding nozzles 102 along the line L3 to the left along the X direction. The nozzles 102 that are projected onto a plane so as to lie in an array along the longitudinal direction of the line head 44 are virtually spaced highly closely at reduced intervals, i.e., reduced projected nozzle pitches.

The line head 44 may incorporate any of various ink droplet ejection mechanisms. The line head 44 may incorporate a piezoelectric mechanism which includes actuators comprising piezoelectric elements, as shown in FIGS. 3 and 4, wherein ink droplets are ejected by deformation of the actuators. Alternatively, the line head 44 may incorporate a thermal jet mechanism which includes heaters for heating the ink to produce air bubbles therein and ejecting ink droplets under the pressure of the air bubbles. Further alternatively, a multi-pass print head for forming an image while moving back and forth transverse across the sheet 12 may be used instead of the line heads 44.

Figure 5:
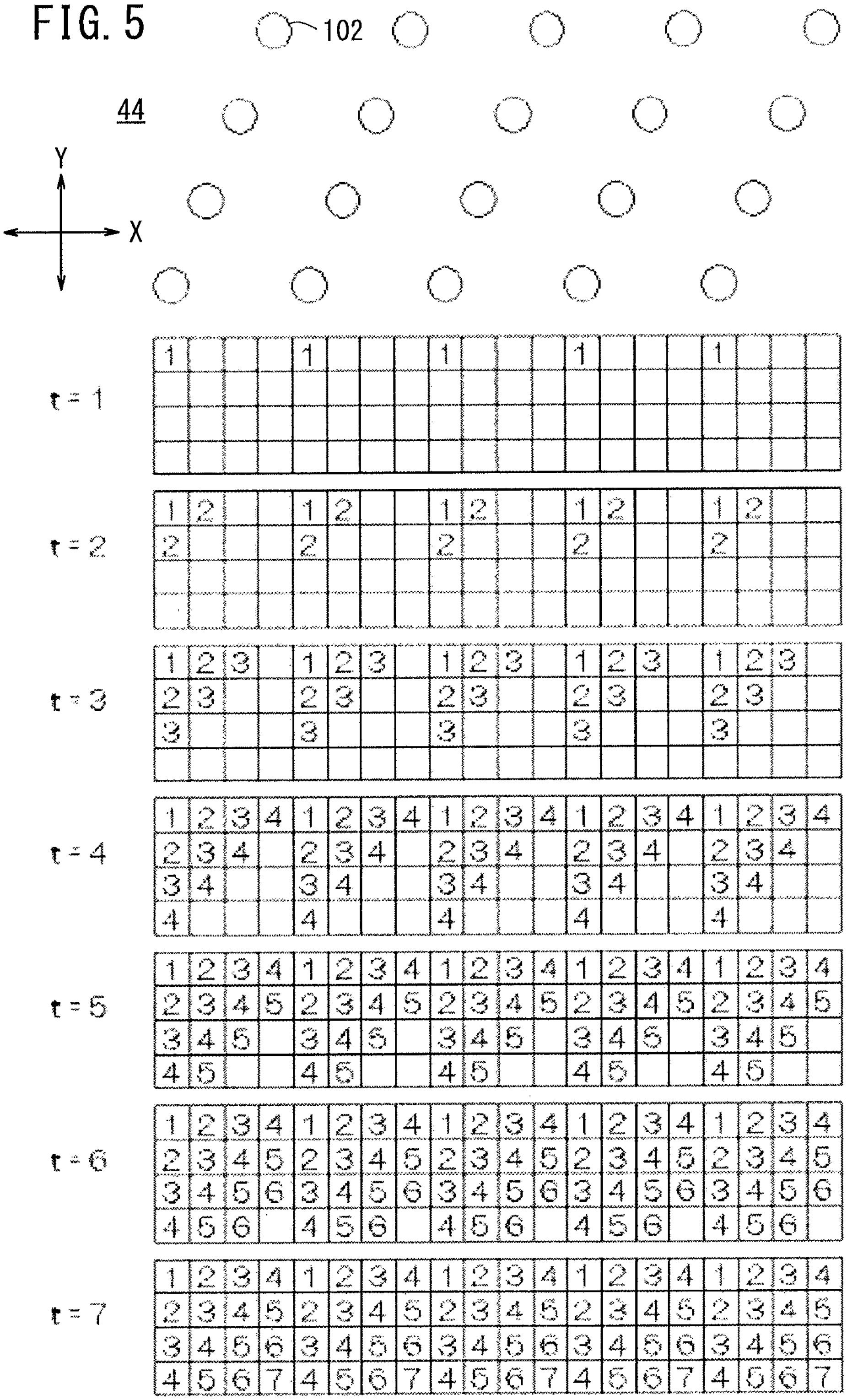
FIG. 5 is a schematic diagram showing the correspondence relationship between an example of the layout of nozzles of the line heads shown in FIG. 1 and a sequence of ink droplets ejected from the nozzles onto a sheet.

FIG. 5 is a schematic diagram showing the correspondence relationship between an example of the layout of the nozzles 102 of each line head 44 and an ejection sequence of ink droplets ejected from the nozzles 102 onto the sheet 12. It is assumed for illustrative purposes that the line head 44 has twenty nozzles 102 for each line in FIG. 5.

Each of rectangular grids shown in FIG. 5 has a matrix of cells each representing a pixel of an image formed by the line head 44. Blank cells indicate image positions where ink droplets have not been ejected from the nozzles 102, i.e., have not been landed on the sheet 12. Cells with numerals indicate image positions where ink droplets have been ejected from the nozzles 102, i.e., have been landed on the sheet 12 at times represented by the numerals, to be described later on. The numerals indicate times (ejection times t=1 through 7) at which ink droplets have been ejected from the nozzles 102, i.e., have been landed on the sheet 12.

Ink droplets successively ejected from the nozzles 102 at ejection times t=1 through 4 successively form a plurality of dots, producing a first image array. Ink droplets successively ejected from the nozzles 102 at ejection times t=4 through 7 successively form a plurality of dots, producing a fourth image array. Stated otherwise, dots are successively formed at a plurality of times (four times in FIG. 5), whereby image arrays are produced, i.e., completed.

Figure 6:
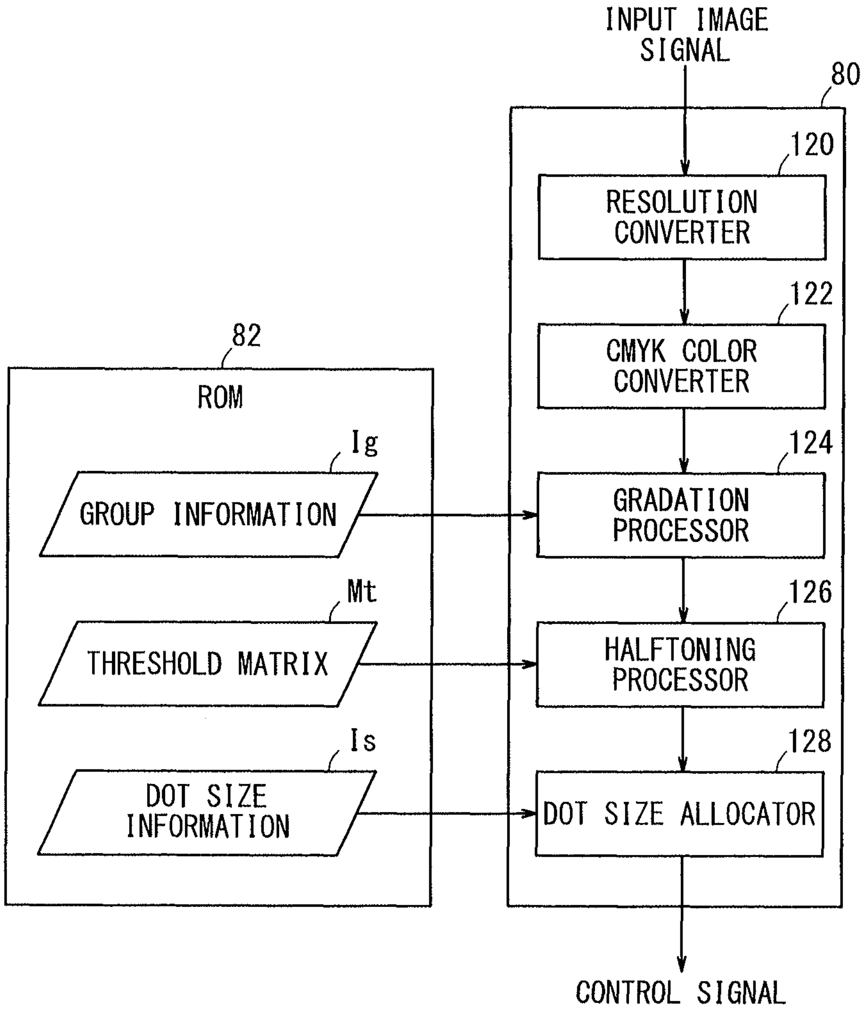
FIG. 6 is a functional block diagram illustrative of an image processing sequence in an image processor shown in FIG. 2.

FIG. 6 is a functional block diagram illustrative of an image processing sequence in the image processor 80 shown in FIG. 2. As shown in FIG. 6, the image processor 80 basically includes a resolution converter 120, a CMYK color converter 122, a gradation processor 124, a halftoning processor 126, and a dot size allocator 128.

An image signal that is input to the image processor 80, i.e., an input image signal, is a continuous-tone image signal having a plurality of color channels. The "continuous-tone" means a gradation that has gradation levels larger than multivalued gradation levels to be described later. The input image signal may be of 8-bit RGB TIFF-format data representing 256 gradations per pixel.

The resolution converter 120 converts the resolution of the input image signal into a resolution depending on the image forming apparatus 10 according to an image scaling process for scaling up or down an image size. The resolution converter 120 generates a first intermediate image signal which has the same data definition as the input image signal, but has a data size different from the input image signal. The image scaling process may be based on any of various known algorithms including interpolation.

The CMYK color converter 122 converts the first intermediate image signal acquired from the resolution converter 120 into device color signals, i.e., C, M, Y, K color signals, that are handled by the image forming apparatus 10, according to a known color matching process. The CMYK color converter 122 generates a second intermediate image signal representing the device color signals. The second intermediate image signal corresponds to continuous-tone C, M, Y, K color signals.

The gradation processor 124 performs a prescribed gradation process on the second intermediate image signal acquired from the CMYK color converter 122. The gradation process is aimed at localizing color shades depending on whether they belong to a plurality of groups or not while macroscopically keeping the signal isochromatic. Prior to the gradation process, the gradation processor 124 acquires group information Ig from the ROM 82. The group information Ig represents a plurality of groups (hereinafter referred to as "time groups") into which dots formed along the X direction (array direction) are classified.

Figures 7A, 7B:
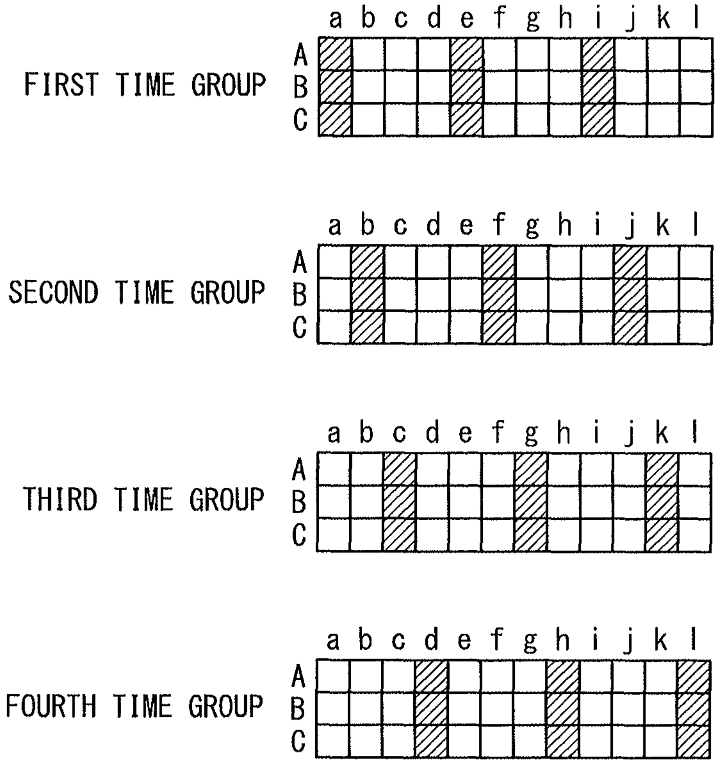
FIG. 7A is a schematic diagram showing sequences of ejection of ink droplets, which correspond to respective image positions, ejected from the nozzles in the layout example shown in FIG. 5.
FIG. 7B is a schematic diagram showing pixels represented by a second intermediate image signal, which are classified into a plurality of time groups.
Figures 15A, 15B:
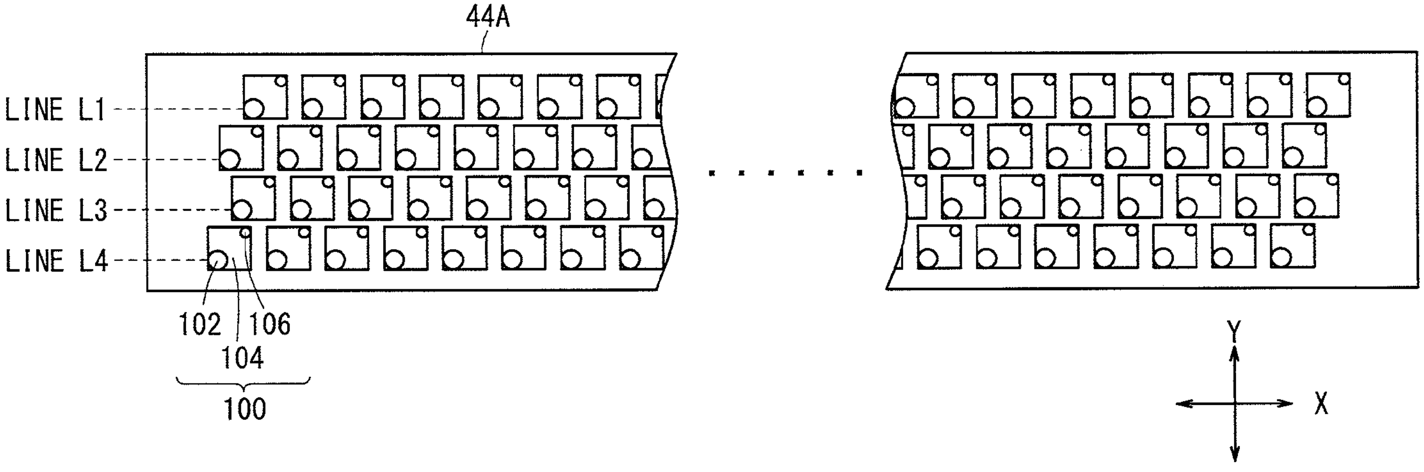
FIG. 15A is a fragmentary plan view showing a configurational example of a line head according to a first modification.
FIG. 15B is a schematic diagram showing sequences of ejection of ink droplets, which correspond to respective image positions, ejected from the nozzles in the layout example shown in FIG. 15A.

FIG. 7A is a schematic diagram showing sequences of ejection of ink droplets, which correspond to respective image positions of cells in a rectangular grid, ejected from the nozzles of the line head 44 shown in FIG. 5. The cells are arranged along horizontal rows that are denoted by "A" through "C" on the left side of the rectangular grid, and along vertical columns that are denoted by "a" through "l" on the upper side of the rectangular grid. The cells of similar rectangular grids that are shown in FIGS. 15B, 20A, and 20B are similarly arranged along rows and columns that are denoted by "A" through "C" and "a" through "l", respectively. For illustrative purposes, cells may be identified using rows and columns, e.g., a cell on the upper left corner of the rectangular grid may be identified as (A, a).

In an upper figure section of FIG. 7A, numerals in the cells indicate turns to eject ink droplets in a sequence over an entire image. For example, in an image position corresponding to the cell that is denoted by a minimum number "1", ink droplets are ejected at the earliest time. In an image position corresponding to the cell that is denoted by a maximum number "6", ink droplets are ejected at the latest time.

In a lower figure section of FIG. 7A, numerals in the cells indicate turns to eject ink droplets in a sequence along one array direction. For example, all cells, i.e., twelve cells, along the row C are classified into four ejection times ranging from the earliest time "3" to the latest time "6" (see the upper figure section of FIG. 7A). On the row C, the time "3" is relatively the earliest, and thus, the cells where ink droplets are ejected at the earliest time "3" are denoted by "1". Groups of cells that are classified based on the ejection times for image arrays along the array direction are defined as "time groups".

As shown in FIG. 7B, all cells denoted by "1", i.e., all cells in the columns "a", "e", "i", are classified into a "first time group". All cells denoted by "2", i.e., all cells in the columns "b", "f", "j", are classified into a "second time group". All cells denoted by "3", i.e., all cells in the columns "c", "g", "k", are classified into a "third time group". All cells denoted by "4", i.e., all cells in the columns "d", "h", "l", are classified into a "fourth time group".

The gradation processor 124 refers to the acquired group information Ig (e.g., the matrix data shown in FIG. 7B) and performs the gradation process on each pixel represented by the second intermediate image signal according to predetermined gradation conversion characteristics for each color plate. The gradation processor 124 generates a third intermediate image signal as a result of the gradation process thus performed. As with the second intermediate image signal, the third intermediate image signal corresponds to continuous-tone C, M, Y, K color signals.

Figure 8:
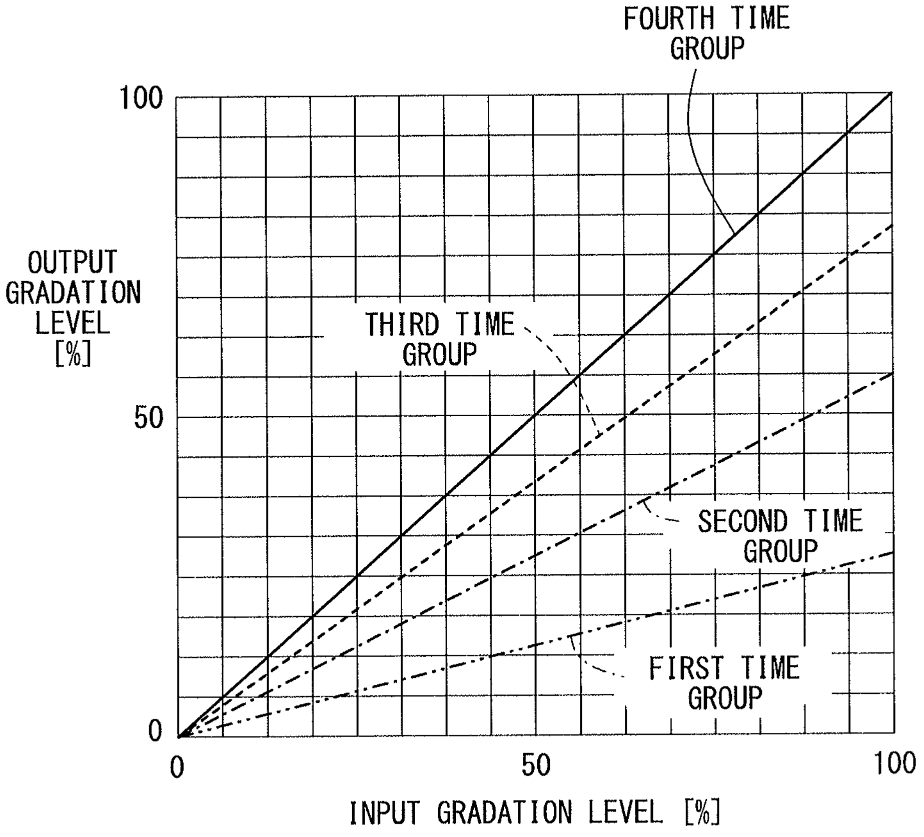
FIG. 8 is a graph showing an example of gradation conversion characteristic curves of a gradation processor shown in FIG. 6 for the respective time groups.

FIG. 8 is a graph showing an example of gradation conversion characteristic curves of the gradation processor 124 shown in FIG. 6 for the respective time groups. As shown in FIG. 8, the gradation conversion characteristic curves for the respective time groups are different from each other. Specifically, the pixels that belong to the first time group which represents early times have relatively low gradation levels, and the pixels that belong to the fourth time group which represents late times have relatively high gradation levels.

In FIG. 6, the halftoning processor 126 converts the third intermediate image signal acquired from the gradation processor 124 into a multivalued image signal representative of multivalued gradations. The produced multivalued image signal is of binary data for each of the colors C, M, Y, K for controlling the line heads 44 to eject ink droplets or not, i.e., to turn on or off ink droplet ejection, in a time sequence. According to the present embodiment, the halftoning processor 126 performs an ordered dither method as the halftoning process, using a threshold matrix Mt (see FIG. 9).

Figure 9:
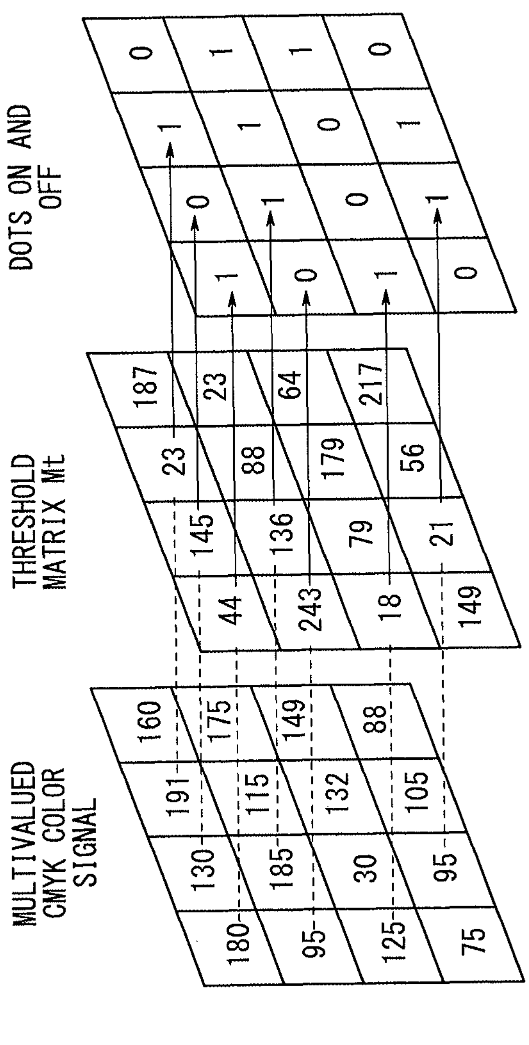
FIG. 9 is a diagram showing a halftoning process according to an ordered dither method, which is carried out by a halftoning processor shown in FIG. 6.

FIG. 9 is a diagram showing a halftoning process according to an ordered dither method, which is carried out by the halftoning processor 126. FIG. 9 shows the concept of a binarizing process based on a Bayer-pattern threshold matrix Mt, as one example. Firstly, the addresses of multivalued C, M, Y, K color signals are associated respectively with the matrix elements of the threshold matrix Mt. Then, the pixel value of each pixel is compared with the threshold value of a corresponding matrix element. If the pixel value is greater than the threshold value, then "1" is assigned to the image signal. Otherwise, "0" is assigned to the image signal. In this manner, the gradation of the image signal is converted from a continuous-tone level into a binary level, thereby generating a binary image signal.

The threshold matrix Mt has a plurality of rows extending in a vertical direction (row direction) which corresponds to the sheet feeding direction along which the sheet 12 is fed, and a plurality of columns extending in a horizontal direction (column direction) which corresponds to the array direction of the nozzles 102. The size of the threshold matrix Mt along the column direction should preferably be an integral multiple of the number of times N=4 (see FIG. 5) required to generate image arrays. Since the threshold matrix Mt and the corresponding pixel positions are synchronized with each other at all times in the halftoning process according to the ordered dither method, only one threshold matrix Mt is sufficient.

Figure 10A:
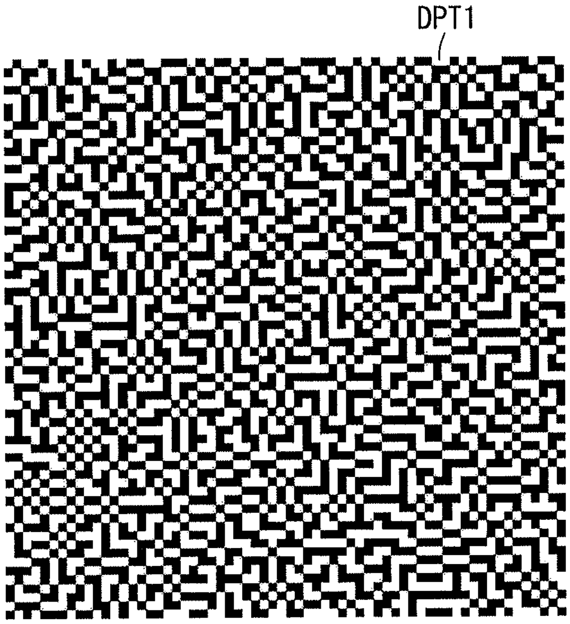
FIGS. 10A and 10B are diagrams showing dot patterns representing visual binary image signals produced by the halftoning process.
Figure 10B:
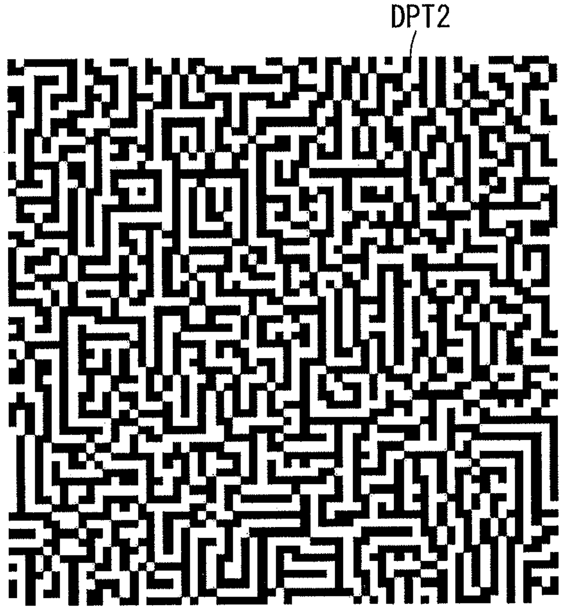

FIGS. 10A and 10B are diagrams showing dot patterns DPT1, DPT2 representing visual binary image signals produced by the halftoning process. The dot patterns DPT1, DPT2 shown in FIGS. 10A and 10B correspond to 50% halftone images that are generated by the halftoning processor 126 using a square threshold matrix Mt having each side made up of 64 pixels.

The dot pattern DPT1 shown in FIG. 10A has a power spectrum which has so-called high-pass (so-called blue-noise) spatial frequency characteristics wherein the intensity level is smaller in a low-to-middle spatial frequency range and greater in a high spatial frequency range. Using the threshold matrix Mt having such dot dispersion characteristics, the image forming apparatus 10 can produce an image wherein granularity is hard to visually recognize.

The dot pattern DPT2 shown in FIG. 10B contains more vertically-joined dots than the dot pattern DPT1 shown in FIG. 10A contains. Using the threshold matrix Mt having such dot dispersion characteristics, the image forming apparatus 10 can reduce adverse effects caused by shifted positions where ink droplets are landed and can produce an image wherein linear irregularities extending in the sheet feeding direction, i.e., the Y direction, are hard to visually recognize.

In FIG. 6, the dot size allocator 128 allocates a dot size to the position of each pixel that is on (pixel value is 1), of a plurality of pixels represented by the binary image signal acquired from the halftoning processor 126. Prior to the allocating process, the dot size allocator 128 acquires dot size information Is from the ROM 82. The dot size information Is represents the gradation level (halftone dot %) represented by the binary image signal, which is associated with the recording ratios of respective dot sizes. The recording radio of each dot size (hereinafter referred to as "dot recording radio") refers to a ratio (0 through 100%) at which dots are recorded with respect to the maximum number of dots that can be formed.

Figure 11:
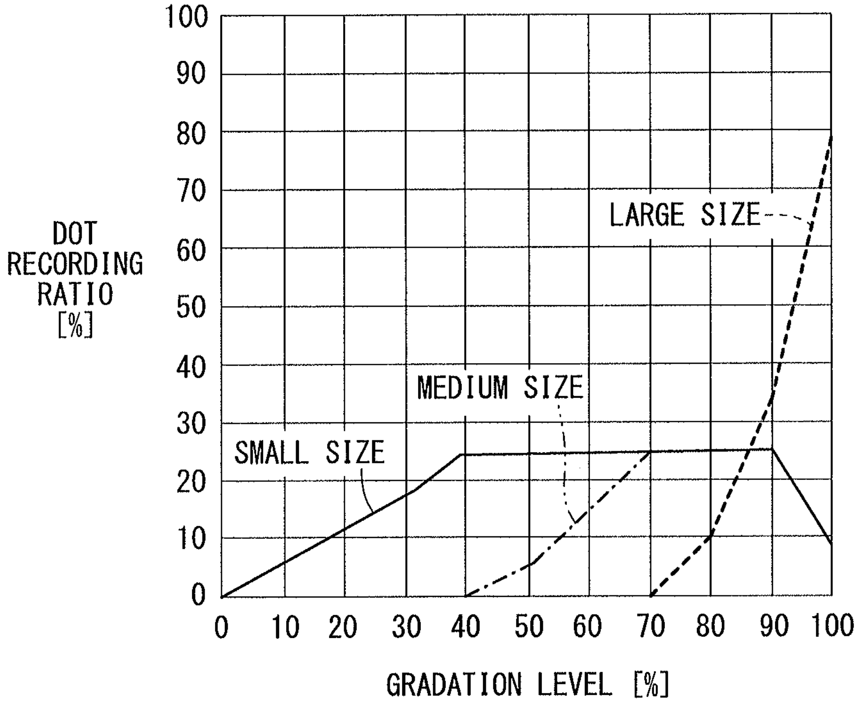
FIG. 11 is a graph showing an example of allocating characteristic curves of a dot size allocator shown in FIG. 6 for a plurality of dot sizes.

FIG. 11 is a graph showing an example of allocating characteristic curves of the dot size allocator 128 shown in FIG. 6 for a plurality of dot sizes. The graph has a horizontal axis representing gradation levels by way of percentage (unit: %) and a vertical axis representing dot recording ratios (unit: %).

It is assumed that the head driver 84 can control the head unit 42 to produce three types of dots, i.e., dots having a "large size", a "medium size", and a "small size", though dots that can be formed are not limited to three sizes, but may be formed in two types or four or more types.

As shown in FIG. 11, the dot recording ratio of the dots of the "small size" increases monotonously in a range of gradation levels from 0 to 40%, is constant (about 25%) in a range of gradation levels from 40 to 90%, and decreases monotonously in a range of gradation levels from 90 to 100%. The dot recording ratio of the dots of the "medium size" is nil in the range of gradation levels from 0 to 40%, increases monotonously in a range of gradation levels from 40 to 70%, is constant (about 25%) in a range of gradation levels from 70 to 90%, and decreases monotonously in the range of gradation levels from 90 to 100%. The dot recording ratio of the dots of the "large size" is nil in a range of gradation levels from 0 to 70% and increases monotonously in a range of gradation levels from 70 to 100%. Thus, by using only the dots of the "small size" in a highlight area (the range of gradation levels from 0 to 40%), a good image with suppressed granularity is produced.

The dot size allocator 128 appropriately allocates dots of the "large size", "medium size", and "small size" to the pixels that are on which are represented by the binary image signal, thereby generating a control signal for controlling the ejection of ink droplets from the head unit 42. The control signal is of multivalued data for each of the colors C, M, Y, K for controlling the head unit 42 (line heads 44) to eject ink droplets or not, i.e., for turning on or off the head unit 42 (line heads 44), or for controlling the amounts of ink droplets ejected from the head unit 42 (line heads 44), in a time sequence. The multivalued data selectively represent, for example, a level "0" indicative of an off-state for the head unit 42 (line heads 44), a level "1" indicative of an on-state (small size) for the head unit 42 (line heads 44), a level "2" indicative of an on-state (medium size) for the head unit 42 (line heads 44), and a level "3" indicative of an on-state (large size) for the head unit 42 (line heads 44).

In the above manner, the image processor 80 has completed its image processing process. Thereafter, the print controller 76 supplies the control signal to the head driver 84. According to the control signal, the head driver 84 controls the head unit 42 to eject ink droplets from the nozzles 102 of the line heads 44 toward the sheet 12. In synchronization with the ejection of ink droplets from the nozzles 102, the sheet 12 is fed along the Y direction thereby to form a desired image thereon.

The dot sizes may be controlled by either a process of controlling the amounts of ink droplets to be ejected or a process of controlling the speed at which ink droplets are ejected. The former process will mainly be described below. Insofar as the speed at which ink droplets are ejected is constant, the sizes of dots that are formed on the sheet 12 usually increase as the amounts of ink droplets ejected from the nozzles 102 increase. Ink droplets for forming dots of the "large size", "medium size", and "small size" on the sheet 12 will hereinafter be referred to as "large droplets", "medium droplets", and "small droplets", respectively.

Advantageous improvement effects of the image formed on the sheet 12 according to the gradation process performed by the gradation processor 124 will be described below with reference to FIGS. 12 through 14. Particularly, attention will be drawn to the way in which an image is formed by the image former 18 (see FIG. 1).

The image processor 80 performs a gradation process according to the gradation conversion characteristic curves (see FIG. 8) depending on the time groups, and carries out the allocating process (see FIG. 11) irrespective of the types of the time groups. Pixels that belong to early time groups have lower gradation levels than pixels that belong to late time groups. In a range of gradation levels from 40 to 100% where two or more dot sizes exist together, the ratio of dots of the small size to all the dots formed as an image is high.

Figure 12:
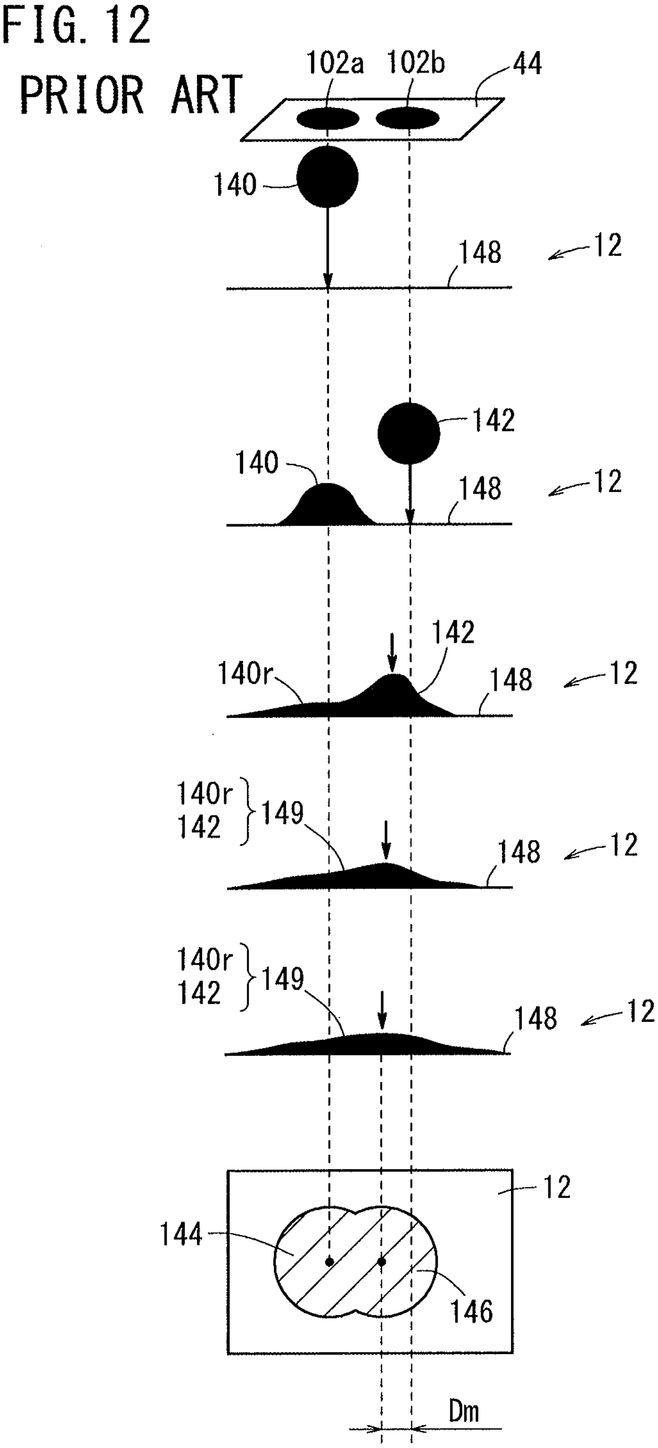
FIG. 12 is a view showing a time sequence of the formation of dots.

FIG. 12 is a view showing a time sequence of the formation of dots with a first droplet 140 and a second droplet 142 that are large droplets. The first droplet 140 is ejected from a first nozzle 102*a* of the line head 44 and landed first on the sheet 12, forming a first dot 144. The second droplet 142 is ejected from a second nozzle 102*b* of the line head 44 and landed subsequently on the sheet 12, forming a second dot 146. It is assumed that the first droplet 140 and the second droplet 142 are ejected toward respective positions on the sheet 12 that are adjacent to each other along the X direction (array direction) with a relatively small time difference.

The first droplet 140 which is ejected at a first time (first time group) is landed on an image forming surface 148 of the sheet 12. After being landed, the first droplet 140 is gradually absorbed into the sheet 12. Then, in a short while, the second droplet 142 which is ejected at a second time (second time group) is landed on the image forming surface 148 of the sheet 12.

At this time, part of the first droplet 140 has already been absorbed in the sheet 12, but the remainder 140*r* of the first droplet 140 still exists on the image forming surface 148. Therefore, the remainder 140*r* of the first droplet 140 is united with the second droplet 142, resulting in an interference between the landed droplets 140, 142. At this time, the inks of the first and second droplets 140, 142 will shift toward each other due to their surface tension. However, because of frictional forces generated due to contact with the image forming surface 148, the remainder 140*r* of the first droplet 140 undergoes a resistive force that tends to prevent it from moving toward the second droplet 142. Part of the second droplet 142 is thus attracted to and shifts toward the remainder 140*r*. The remainder 140*r* and the second droplet 142 are then absorbed as a united droplet 149 into the sheet 12.

As a result, the second dot 146 that is formed by the second droplet 142 is shifted from an ideal position thereof toward the first dot 144 that is formed by the first droplet 140. The distance that the center of gravity of the subsequently formed second dot 146 is shifted toward the first dot 144 will hereinafter be referred to as "dot movement distance Dm".

Figure 13:
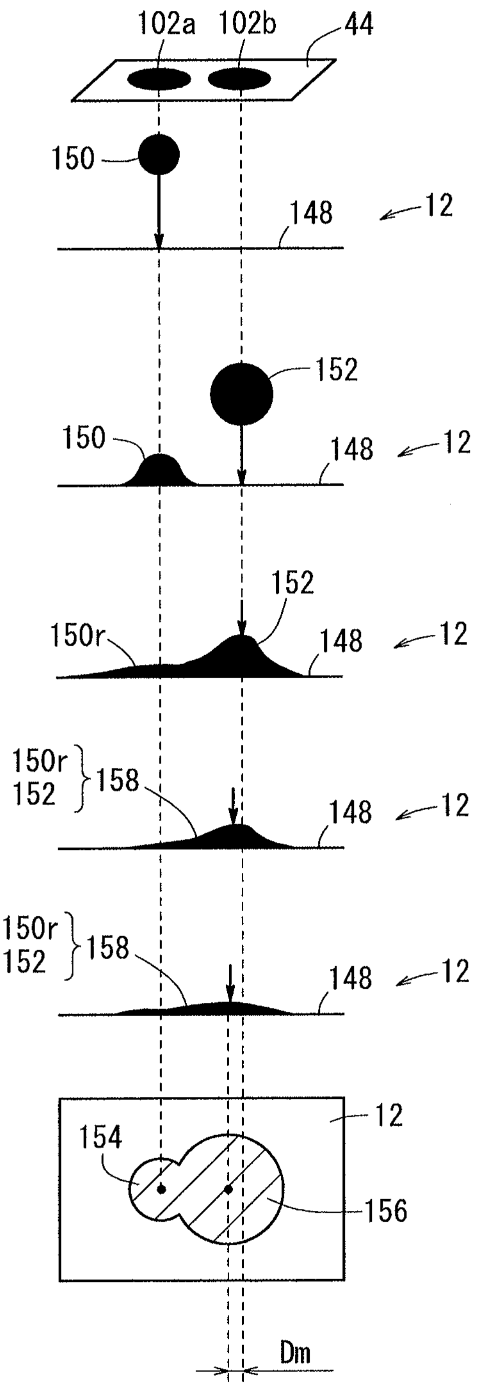
FIG. 13 is a view showing a time sequence of the formation of dots.

FIG. 13 is a view showing a time sequence of the formation of dots with a first droplet 150 which is a small droplet and a second droplet 152 which is a large droplet. The first droplet 150 is ejected from the first nozzle 102*a* of the line head 44 and landed first on the sheet 12, forming a first dot 154. The second droplet 152 is ejected from the second nozzle 102*b* of the line head 44 and landed subsequently on the sheet 12, forming a second dot 156. The formation of dots shown in FIG. 13 is different from the formation of dots shown in FIG. 12 only in that the first droplet 150 ejected at the early time is a small droplet.

The first droplet 150 which is ejected at a first time (first time group) is landed on the image forming surface 148 of the sheet 12. After being landed, the first droplet 150 is gradually absorbed into the sheet 12. Then, in a short while, the second droplet 152 which is ejected at a second time (second time group) is landed on the image forming surface 148 of the sheet 12.

At this time, part of the first droplet 150 has already been absorbed in the sheet 12, but the remainder 150*r* of the first droplet 150 still exists on the image forming surface 148. However, since the first droplet 150 is smaller in amount than the first droplet 140 (see FIG. 12), the remainder 150*r* is also smaller in amount than the remainder 140*r* (see FIG. 12). Consequently, the force tending to unite the remainder 150*r* of the first droplet 150 with the second droplet 152 is smaller, and hence the amounts of the remainder 150*r* and the second droplet 152 that shift toward each other, particularly, the amount of the second droplet 152 that shifts toward the remainder 150*r*, are smaller. The remainder 150*r* and the second droplet 152 are then absorbed as a united droplet 158 into the sheet 12. As a consequence, the dot movement distance Dm that the second dot 156 is shifted toward the first dot 154 is smaller than the dot movement distance Dm that the second dot 146 is shifted toward the first dot 144.

Figure 14:
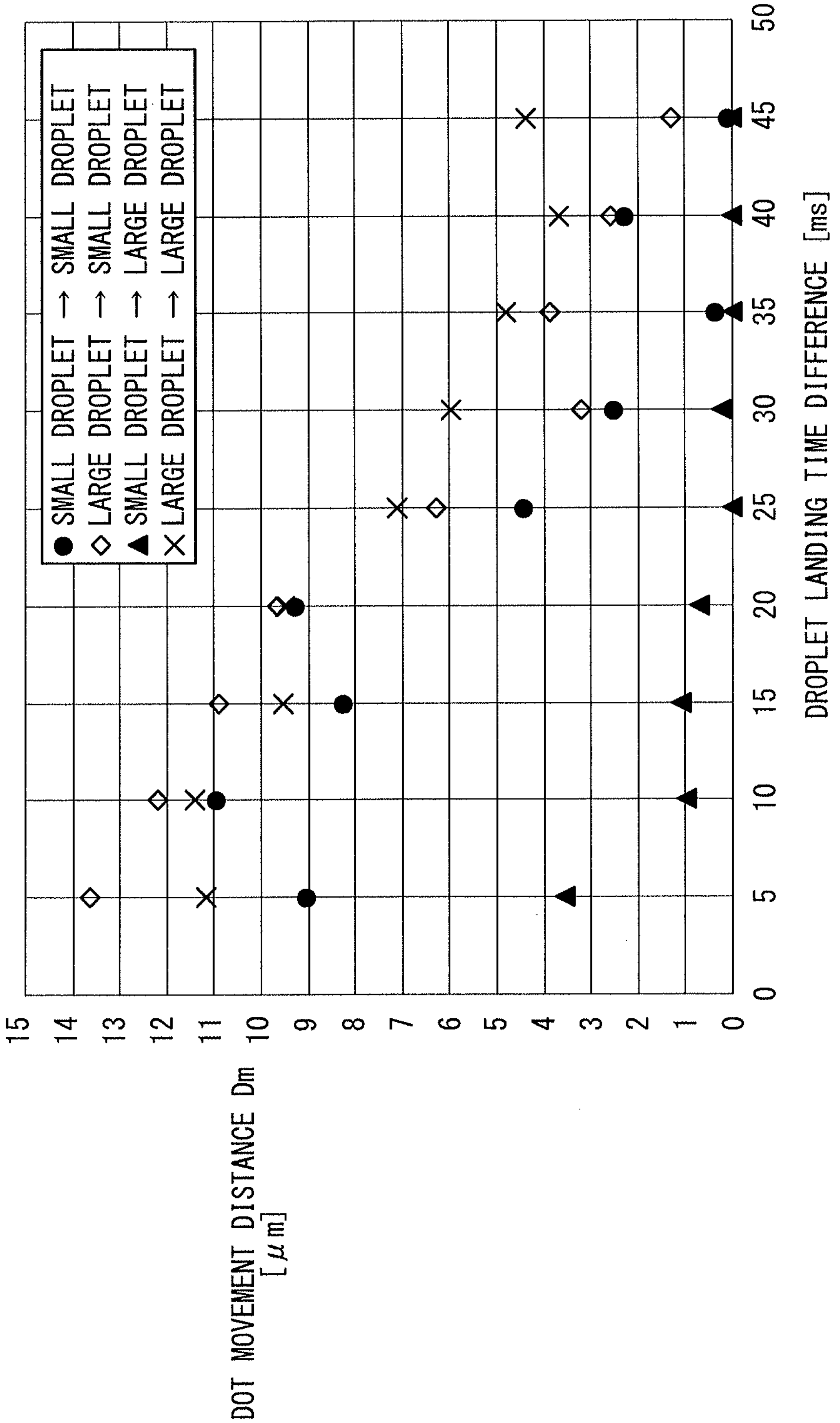
FIG. 14 is a graph showing the relationship between dot movement distances and droplet landing time differences.

FIG. 14 is a graph showing the relationship between dot movement distances DM and droplet landing time differences. The graph has a horizontal axis representative of time intervals from the landing of the first droplets 140, 150 to the landing of the second droplets 142, 152, i.e., the droplet landing time differences (unit: ms), and a vertical axis representative of distances that the center of gravity of the subsequently formed second dots 146, 156 is shifted, i.e., the dot movement distances Dm (unit: μm).

Dot movement distances Dm due to an interference between landed ink droplets were measured for all combinations (four) of droplets (two) and sequences (two). In the graph, a droplet landing sequence wherein the "large droplet" is landed first and then the "small droplet" is subsequently landed, for example, is indicated as "LARGE DROPLET→SMALL DROPLET".

As shown in FIG. 14, all the combinations of the dot sizes exhibit a common tendency that as the landing time difference is smaller, the dot movement distance Dm is larger, and as the landing time difference is larger, the dot movement distance Dm is smaller. For example, if the landing time difference is 25 ms, for example, then, in ascending order of the dot movement distances Dm (i.e., in ascending order of the extent of interference influences between landed ink droplets), the droplet landing sequences are arranged as (1) "SMALL DROPLET→LARGE DROPLET", (2) "SMALL DROPLET→SMALL DROPLET", (3) "LARGE DROPLET→SMALL DROPLET", and (4) "LARGE DROPLET→LARGE DROPLET". If the landing time difference is 5 ms, for example, then, in ascending order of the dot movement distances Dm (i.e., in ascending order of the extent of the interference influences), the droplet landing sequences are arranged as (1) "SMALL DROPLET→LARGE DROPLET", (2) "SMALL DROPLET→SMALL DROPLET", (3) "LARGE DROPLET→LARGE DROPLET", and (4) "LARGE DROPLET→SMALL DROPLET".

As described above, the dots (the first dot 154, the second dot 156) formed along the X direction (array direction) are classified into the first through fourth time groups (plurality of groups) depending on a plurality of times, such that the ratio of dots (the first dot 154) of the small size is higher in an early time group. Accordingly, adverse physical effects due to an interference between landed ink droplets (the first droplet 150 and the second droplet 152) are reduced, and the shape of dots formed by landed ink droplets can be appropriately controlled.

With respect to each of the image arrays along the X direction, the amount of a first droplet 150 to be firstly ejected is relatively reduced, or stated otherwise, the size of a first dot 154 formed at an early time is relatively reduced. Consequently, in a case where the subsequent second droplet 152 is landed, the remaining amount of the early first droplet 150 that exists on the sheet 12 is minimized. The transfer amount of the subsequent second droplet 152 which transfers toward the first droplet 150 is thus reduced, and hence any positional shift (dot movement distance Dm) of the second dot 156 that is formed at a late time is reduced. As a result, a reduction caused in the quality of an image formed of the dots on the sheet 12 due to a landed ink droplet interference is minimized.

Modifications of the first embodiment will be described below with reference to FIGS. 15A, 15B, and 16. These modifications may be combined with a second embodiment, to be described later, of the present invention.

<First Modification>

As shown in FIG. 15A, a line head (dot former) 44A according to a first modification is different from the line head 44 (see FIG. 5) according to the first embodiment as to the layout of the nozzles 102. The present invention is applicable to different layouts of the nozzles 102.

FIG. 15A is a fragmentary plan view showing a configurational example of the nozzles 102 of the line head 44A according to the first modification, and a correspondence relationship between the nozzles and the sequences of the ejection on the sheet 12. As shown in FIG. 15A, the nozzles 102 along the line L2 and the nozzles 102 along the line L3 are equivalent to the nozzles 102 along the line L3 and the nozzles 102 along the line L2, respectively, shown in FIG. 3, and the configuration of the nozzles 102 in FIG. 15A can be provided by switching around the nozzles 102 along the line L2 and the nozzles 102 along the line L3 shown in FIG. 3. Ink droplets ejected from the nozzles 102 at ejection times t=1 through 4 successively form a plurality of dots, producing a first image array. Ink droplets successively ejected from the nozzles 102 at ejection times t=4 through 7 successively form a plurality of dots, producing a fourth image array. Stated otherwise, dots are successively formed at four times, whereby image arrays are produced, i.e., completed.

With the configurational example of the line head 44A shown in FIG. 15A, ink droplets, which correspond to respective image positions in image arrays along the array direction, are ejected according to sequences shown in FIG. 15B. As with the sequences shown in FIG. 7B, the dots (pixels) are classified into four time groups, i.e., first through fourth time groups.

<Second Modification>

Figure 16:
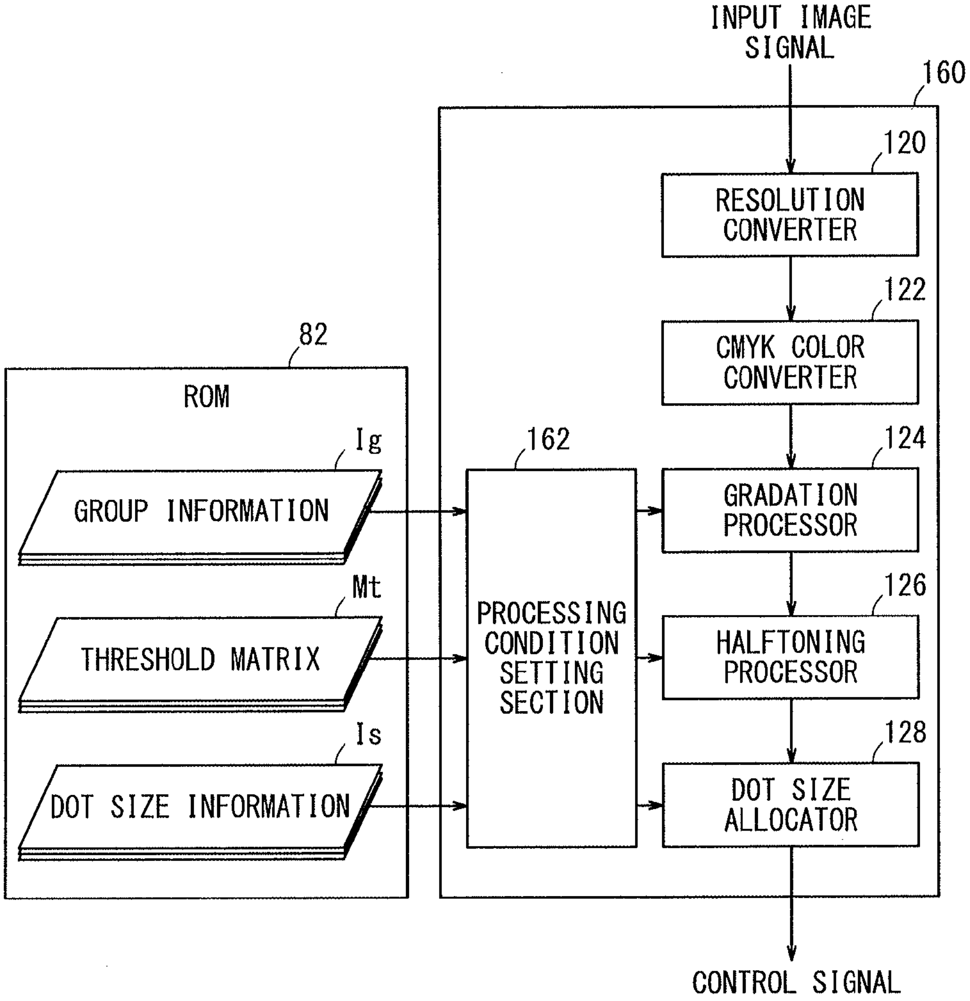
FIG. 16 is a functional block diagram illustrative of an image processing sequence in an image processor according to a second modification.

As shown in FIG. 16, an image processor 160 (signal converter) according to a second modification includes the resolution converter 120, the CMYK color converter 122, the gradation processor 124, the halftoning processor 126, the dot size allocator 128, and a processing condition setting section 162.

The processing condition setting section 162 sets a processing condition for converting an input image signal into a control signal, e.g., a process for classifying a plurality of groups and/or an existing ratio of dots. After the processing condition setting section 162 has acquired a plurality of items of group information Ig stored in the ROM 82, it supplies either one of the items of group information Ig depending on a given setting instruction to the gradation processor 124. Alternatively, after the processing condition setting section 162 has acquired a plurality of threshold matrices Mt stored in the ROM 82, it supplies either one of the threshold matrices Mt depending on a given setting instruction to the halftoning processor 126. Further alternatively, after the processing condition setting section 162 has acquired a plurality of items of dot size information Is stored in the ROM 82, it supplies either one of the items of dot size information Is depending on a given setting instruction to the dot size allocator 128.

The group information Ig according to the first embodiment (see FIG. 7B) represents a plurality of time groups into which dots ejected at four times are classified. However, dots ejected at four times may be classified into a less number of time groups than the total number (four in this case) of times at which the dots are ejected. For example, group information Ig other than the group information Ig according to the first embodiment may indicate that all the cells denoted by "1" and "2" in the lower figure section of FIG. 7A are classified into the "first time group", and all the cells denoted by "3" and "4" in the lower figure section of FIG. 7A are classified into the "second time group". In addition, dot size information Is other than the dot size information Is according to the first embodiment may represent allocating characteristic curves different from those shown in FIG. 11, e.g., allocating characteristic curves shown in FIG. 22 to be described later.

The processing condition setting section 162 may also change the gradation conversion characteristic curves according to the first embodiment (see FIG. 8) depending on a given setting instruction. For example, if the gradation conversion characteristic curves are linear, then the processing condition setting section 162 may change the gradients (indicating how dots are localized) of the linear gradation conversion characteristic curves. The gradation processor 124 performs the gradation process using the gradation conversion characteristic curves changed by the processing condition setting section 162 so as to indirectly change the existing ratios of dots of various sizes for forming an image.

The setting instruction may be given to the processing condition setting section 162 based on a communication signal from an external apparatus that includes the host apparatus 86, or may be given to the processing condition setting section 162 through an operating device, not shown, of the image forming apparatus 10. The user may use the image forming apparatus 10 to print a prescribed test pattern on the sheet 12, measure the printed test pattern for image quality evaluation, etc., and may enter and set preferred processing conditions for forming an image based on results of the measurement.

<Third Modification>

According to a third modification, the halftoning processor 126 shown in FIG. 6 may incorporate the function of the dot size allocator 128, so that the halftoning process and the allocating process can be performed at the same time. Specifically, the halftoning processor 126 directly converts a continuous-tone third intermediate image signal into a multivalued image signal selectively indicative of three or more values (e.g., four values representing an off-state, a small size, a medium size, and a large size). The halftoning processor 126 may employ various known processes in carrying out the halftoning process. For example, the halftoning processor 126 may employ an ordered dither method based on a threshold matrix Mt having dot dispersion characteristics wherein the existing ratio of dots of a small size is higher for an earlier time group.

Second Embodiment

An image forming apparatus 210 according to a second embodiment will be described below with reference to FIGS. 17 through 22. Those parts of the image forming apparatus 210 which are identical to those of the image forming apparatus 10 according to the first embodiment are denoted by identical reference characters, and will not be described in detail below.

Figure 17:
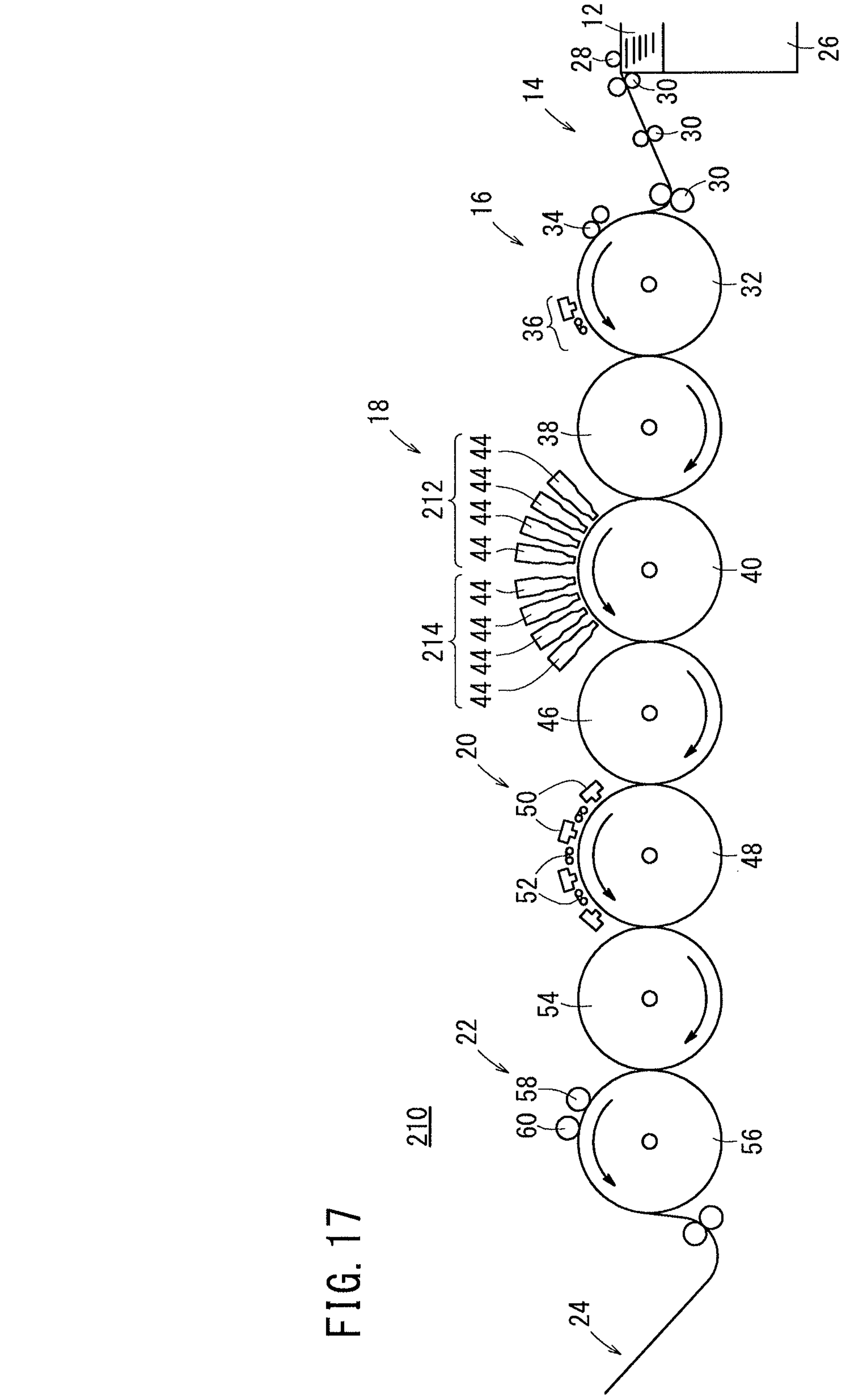
FIG. 17 is a sectional side elevational view of an image forming apparatus according to a second embodiment of the present invention.

FIG. 17 is a sectional side elevational view of the image forming apparatus 210 according to the second embodiment. The image former 18 of the image forming apparatus 210 includes, in addition to the image forming drum 40, two head units 212, 214 for ejecting ink droplets onto the sheet 12 that is fed by the image forming drum 40. Each of the head units 212, 214 includes four line heads 44 in basic colors, i.e., Y, M, C, and K. Stated otherwise, two line heads 44 are available for each of the different colors C, M, Y, K.

Figure 18:
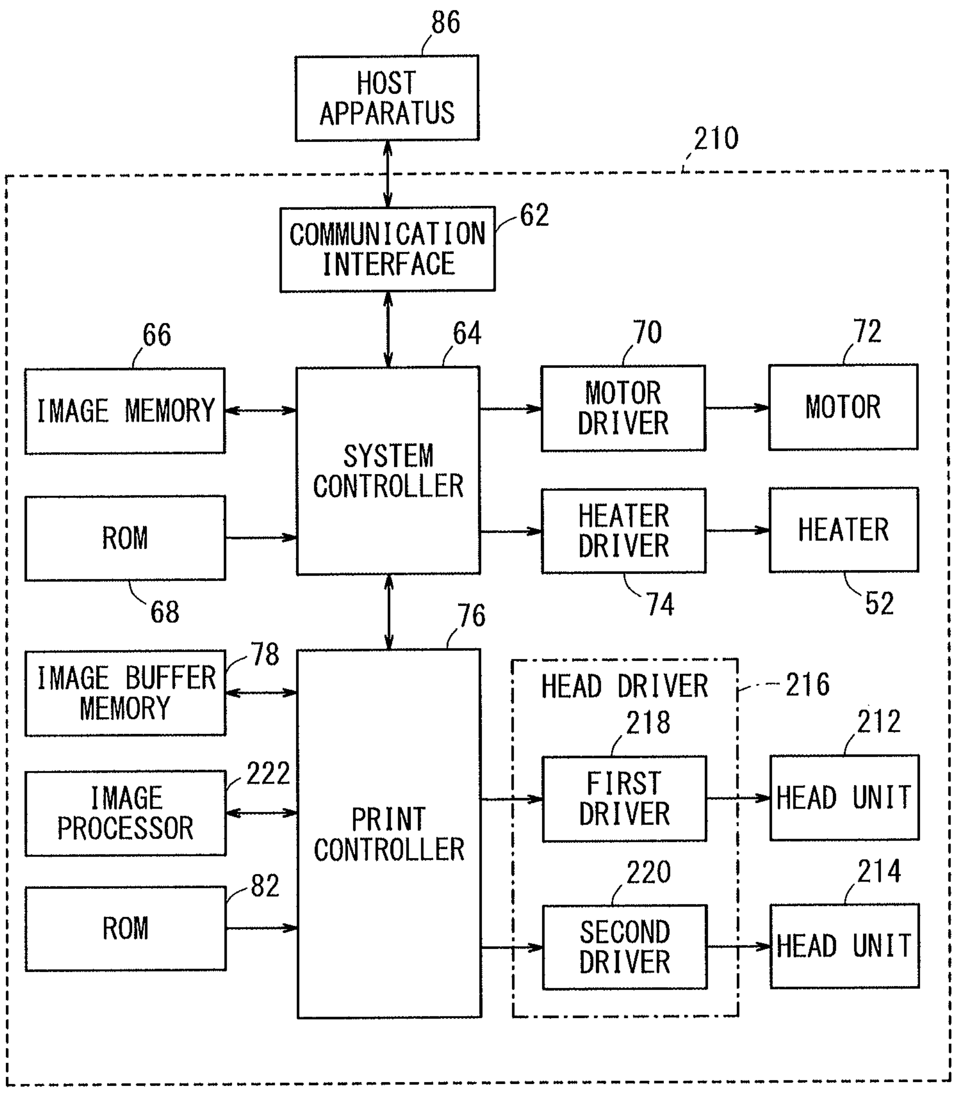
FIG. 18 is a block diagram showing a system arrangement of the image forming apparatus shown in FIG. 17.

FIG. 18 is a block diagram showing a system arrangement of the image forming apparatus 210 shown in FIG. 17. As shown in FIG. 17, a head driver 216, which corresponds to the head driver 84 (see FIG. 2), functions as a first driver 218 that is capable of independently controlling the line heads 44 of the head unit 212 and a second driver 220 that is capable of independently controlling the line heads 44 of the head unit 214. In other words, the head driver 216 is capable of independently controlling the head units 212, 214.

Figure 19:
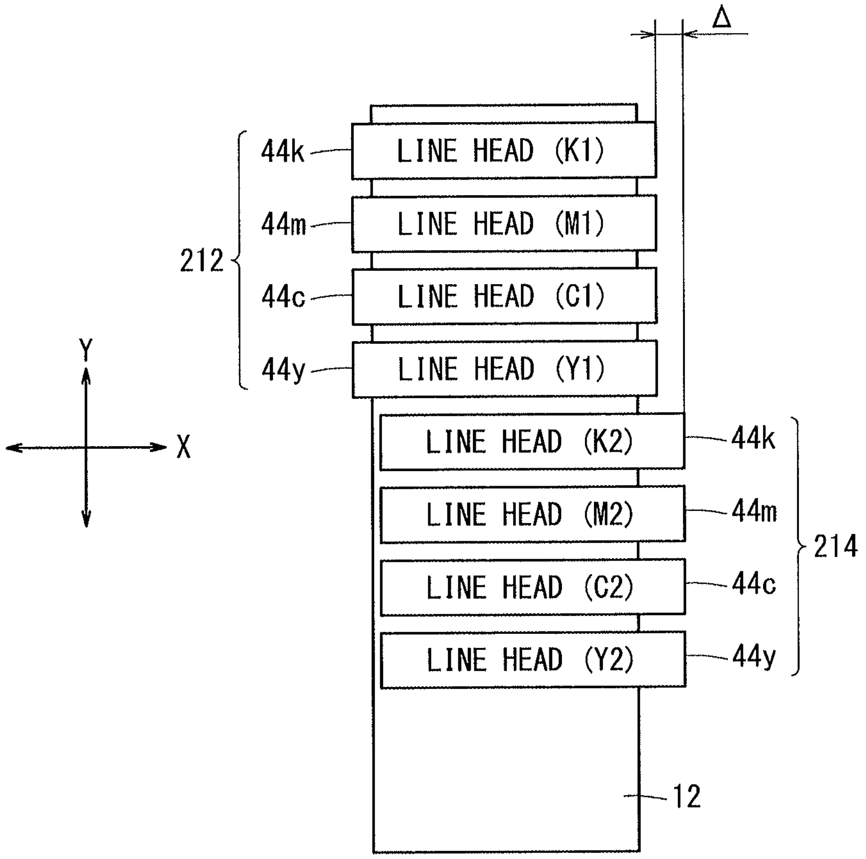
FIG. 19 is a schematic view showing a layout example of a plurality of line heads.

FIG. 19 is a schematic view showing a layout example of the line heads 44. In FIG. 19, each of the head units 212, 214 has a line head 44*k* in K, a line head 44*m* in M, a line head 44*c* in C, and a line head 44*y* in Y successively arranged in the order named from above. The line heads 44 are denoted by the reference numeral "44" with suffixes "k", "m", "c", "y" to indicate the types of the line heads 44.

The head units 212, 214 are juxtaposed along the Y direction, i.e., the sheet feeding direction. The head unit 214, which is disposed downstream of the head unit 212 along the sheet feeding direction, is disposed at a position that is shifted by a distance Δ from the head unit 212 to the right along the X direction. The distance Δ is equivalent to the above-mentioned two unit lengths, i.e., one-half of the distance by which adjacent nozzles 102 shown in FIG. 3 are spaced from each other along the X direction.

While the sheet 12 is being fed at a constant speed upon rotation of the image forming drum 40 (see FIG. 17), ink droplets in K are ejected from the line heads 44*k* of the head units 212, 214 at given time intervals Δt (Δt=1 in the second embodiment), and landed on the sheet 12. A plurality of dots in black are now successively formed on the sheet 12 along the sheet feeding direction. By thus successively forming dots at a plurality of times (two times in the second embodiment), image arrays along the X direction are generated or completed.

The head units 212, 214 are positionally shifted by the distance Δ from each other, as described above. According to such a positional relationship between the head units 212, 214, gaps formed along the X direction between the dots in one color that are produced by one line head 44*k* or 44*c* or 44*m* or 44*y* are filled with dots in the same color that are produced by the other line head 44*k* or 44*c* or 44*m* or 44*y*. Consequently, the resolution of the generated image is increased along the X direction. The head driver 84 may control the head units 212, 214 so as to fill gaps formed along the Y direction between the dots in one color that are produced by one line head 44*k* or 44*c* or 44*m* or 44*y* with dots in the same color that are produced by the other line head 44*k* or 44*c* or 44*m* or 44*y*, also for thereby increasing the resolution of the generated image along the Y direction.

Each of the line heads 44 is not limited to the configuration which has nozzles in the lines L1 through L4 shown in FIG. 3. Rather, each of the line heads 44 may be configured to have at least one line of nozzles arranged along the array direction, i.e., the X direction. Alternatively, a plurality of head units 212, 214, i.e., three or more head units, which are capable of forming dots in one color, may be employed in the image former 18. The individual line heads 44 which are capable of forming dots in one color may be integrally joined together into a head module.

FIG. 20A is a schematic diagram showing sequences of ejection of ink droplets, which correspond to respective image positions, ejected from the nozzles 102 in the layout example shown in FIG. 3. FIG. 20B is a schematic diagram showing sequences of ejection of ink droplets, which correspond to respective image positions, ejected from the nozzles 102 in the layout example shown in FIG. 15A.

In upper figure sections of FIGS. 20A and 20B, numerals in the cells indicate turns of ejection of ink droplets in an ejection sequence over an entire image. For example, in an image position corresponding to the cell that is denoted by a minimum number "0", ink droplets are ejected at the earliest time. In an image position corresponding to the cell that is denoted by a maximum number "9", ink droplets are ejected at the latest time.

In lower figure sections of FIGS. 20A and 20B, numerals in the cells indicate turns of ejection of ink droplets in an ejection sequence along the array direction. For example, all cells, i.e., sixteen cells, along the row C are classified into eight ejection times ranging from the earliest time "2" to the latest time "9". The cells where ink droplets are ejected at the earliest time "2" are denoted by a minimum value "1".

The cells denoted by "1" through "8" in the lower figure sections of FIGS. 20A and 20B are classified into eight time groups including a "first time group" through an "eight time group". The present invention is applicable to the plural head units 212, 214 that are independently controllable, in the same manner as the single head unit 42 (see FIG. 1).

Figure 21:
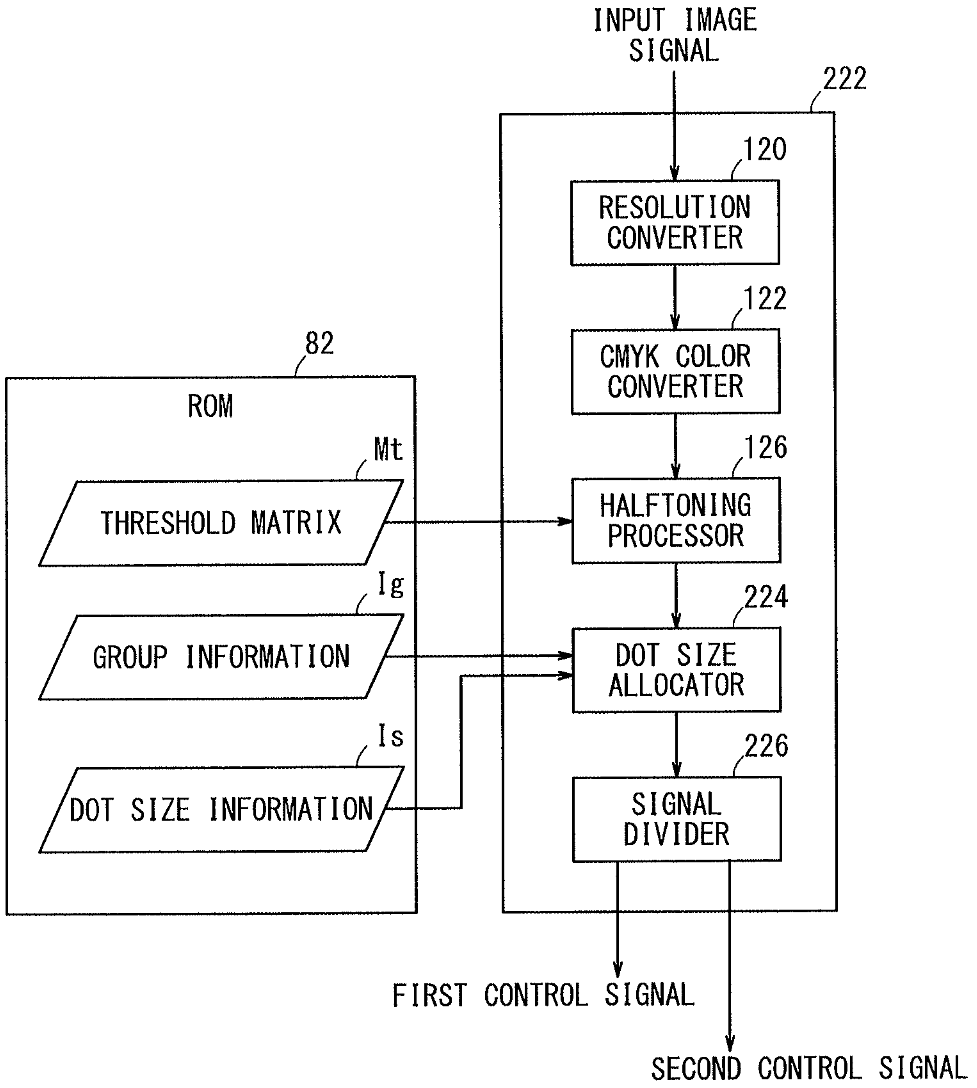
FIG. 21 is a functional block diagram illustrative of an image processing sequence of an image processor shown in FIG. 18.

FIG. 21 is a functional block diagram illustrative of an image processing sequence of an image processor (signal converter) 222 shown in FIG. 18. As shown in FIG. 21, the image processor 222 includes the resolution converter 120, the CMYK color converter 122, the halftoning processor 126, a dot size allocator 224, and a signal divider 226. Though the image processor 222 is devoid of the gradation processor 124 of the image processor 80 according to the first embodiment shown in FIG. 6, the image processor 222 additionally includes the signal divider 226. The dot size allocator 224 is different from the dot size allocator 128 according to the first embodiment in that it is supplied with not only the dot size information Is but also the group information Ig from the ROM 82.

Figure 22:
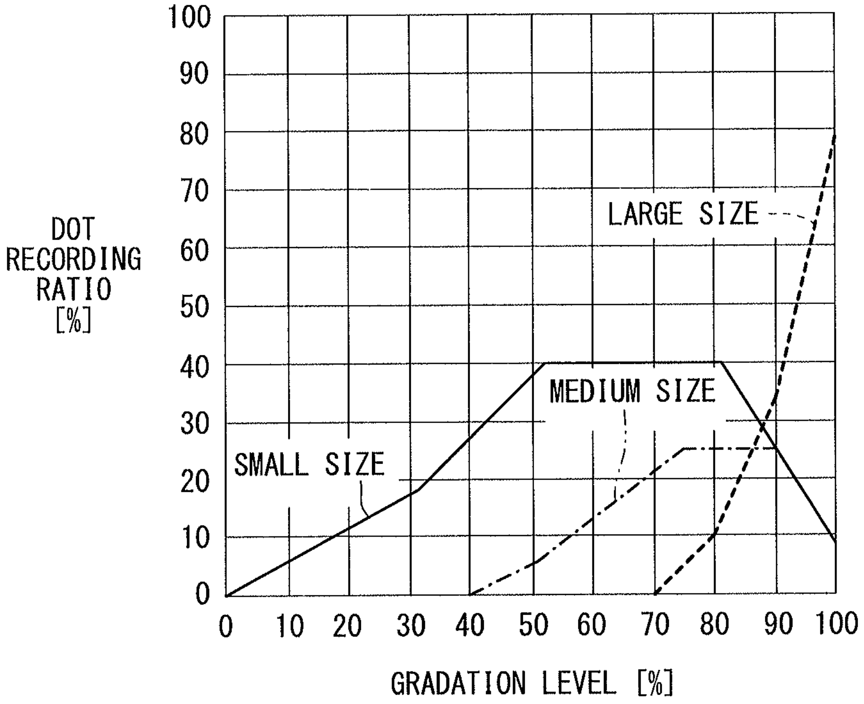
FIG. 22 is a graph showing an example of allocating characteristic curves for a plurality of dot sizes in an early time group.

FIG. 22 is a graph showing another example of allocating characteristic curves for a plurality of dot sizes in an early time group. As shown in FIG. 22, the dot recording ratio of the dots of the "small size" increases monotonously in a range of gradation levels from 0 to 50%, is constant (about 40%) in a range of gradation levels from 50 to 80%, and decreases monotonously in a range of gradation levels from 80 to 100%. The dot recording ratio of the dots of the "medium size" is nil in a range of gradation levels from 0 to 40%, increases monotonously in a range of gradation levels from 40 to 75%, is constant (about 25%) in a range of gradation levels from 75 to 90%, and decreases monotonously in a range of gradation levels from 90 to 100%. The dot recording ratio of the dots of the "large size" is nil in a range of gradation levels from 0 to 70% and increases monotonously in a range of gradation levels from 70 to 100%. According to the allocating characteristic curves shown in FIG. 22, the recording ratio (and the existing ratio) of the dots of the small size is higher in a certain range of gradation levels from 40 to 90% than according to the allocating characteristic curves shown in FIG. 11.

The dot size allocator 224 allocates dot sizes according to the allocating characteristic curves shown in FIG. 22 to pixels belonging to a relatively early time group, e.g., the first time group. The dot size allocator 224 allocates dot sizes according to the allocating characteristic curves shown in FIG. 11 to pixels belonging to a relatively late time group, e.g., the ninth time group.

The dot size allocator 224 generates a mixture of control signals including a first control signal to be supplied to the head unit 212 and a second control signal to be supplied to the head unit 214. The signal divider 226 divides the control signals into the first control signal and the second control signal depending on memory addresses where they are stored. Specifically, the signal divider 226 produces the first control signal by extracting control signal data at odd-numbered addresses along the X direction from the control signals, and the second control signal by extracting control signal data at even-numbered addresses along the X direction from the control signals.

In this manner, the image processor 222 has completed its image processing process. Thereafter, the print controller 76 supplies the first control signal and the second control signal to the head driver 216. Through the first driver 218, the head driver 216 controls the head unit 212 to eject ink droplets from the nozzles 102 toward the sheet 12 at desired times, and also controls, through the second driver 220, the head unit 214 to eject ink droplets from the nozzles 102 toward the sheet 12 at desired times.

As described above, the allocating characteristic curves shown in FIG. 22 wherein the recording ratio of the dots of the small size is higher for the head unit 212 that is positioned more upstream of the head unit 214 with respect to the sheet feeding direction, i.e., for earlier time groups, are employed, so that the same advantages as those according to the first embodiment can be obtained.

While the four color plates C, M, Y, K have mainly been described in the above embodiments, the present invention may be carried out on any types or number of color plates. For example, standard inks in C, M, Y, K and optional inks in pale colors such as LC (light cyan), LM (light magenta), etc., and W (white) may be combined with each other.

In the above embodiments, only the sheet 12 is fed by the rotation of the image forming drum 40. However, at least one of the head unit 42 (or the head units 212, 214) and the sheet 12 may be delivered because the present invention is applicable if they are moved relatively to each other.

In the above embodiments, the predetermined halftoning conditions (e.g., the threshold matrix Mt, the error dispersion matrix) are stored in the ROM 82. However, the image forming apparatus 10, 210 may include an arrangement for generating halftoning conditions (condition generator).

Although certain preferred embodiments of the present invention have been shown and described in detail, it should be understood that various changes and modifications may be made therein without departing from the scope of the appended claims.

What is claimed is:

1. An image forming apparatus comprising:

a dot former including a plurality of dot forming elements arranged along an array direction for ejecting droplets to form dots of at least two sizes on a recording medium;

a dot formation controller for controlling the dot former based on a control signal supplied to the dot formation controller, to form the dots successively at a plurality of times to generate image arrays along the array direction while the dot former and the recording medium are being moved relatively to each other; and a signal converter for converting an input image signal into the control signal supplied to the dot formation controller such that if the dots formed along the array direction are classified into a plurality of groups depending on the plurality of times, an existing ratio of dots of a smaller one of the at least two sizes is higher for one of the groups of an earlier time of the times.

2. The image forming apparatus according to claim 1, wherein the signal converter includes a halftoning processor for performing a halftoning process on a continuous-tone image signal depending on the input image signal to acquire a multivalued image signal having fewer gradation levels than the continuous-tone image signal.

3. The image forming apparatus according to claim 2, wherein the signal converter further includes a gradation processor for performing a gradation process depending on the classified groups on the input image signal, thereby to generate the continuous-tone image signal in which the existing ratio of dots of the smaller one of the at least two sizes is higher for the one of the groups of the earlier time of the times.

4. The image forming apparatus according to claim 2, wherein the multivalued image signal comprises a binary image signal selectively representative of on and off states of the dots; and the signal converter further includes a dot size allocator for allocating the at least two sizes to the binary image signal acquired by the halftoning processor for thereby generating the control signal in which the existing ratio of dots of the smaller one of the at least two sizes is higher for the one of the groups of the earlier time of the times.

5. The image forming apparatus according to claim 2, wherein the halftoning processor converts the input image signal into the control signal according to an ordered dither method, using a threshold matrix having dot dispersion characteristics in which the existing ratio of dots of the smaller one of the at least two sizes is higher for the one of the groups of the earlier time of the times.

6. The image forming apparatus according to claim 5, wherein the threshold matrix has a size which is an integral multiple of the number of times required to generate each of the image arrays.

7. The image forming apparatus according to claim 1, wherein the signal converter includes a processing condition setting section for setting a process for classifying the plurality of groups and/or an existing ratio of the dots as a processing condition for converting the input image signal into the control signal.

8. The image forming apparatus according to claim 1, further comprising:

at least one dot former for forming dots which are of the same color as the dots formed by the first-mentioned dot former on the recording medium.

9. An image forming method using an image forming apparatus including a dot former including a plurality of dot forming elements arranged along an array direction for ejecting droplets to form dots of at least two sizes on a recording medium, and a dot formation controller for controlling the dot former based on a control signal supplied to the dot formation controller, to form the dots successively at a plurality of times to generate image arrays along the array direction while the dot former and the recording medium are being moved relatively to each other, the image forming method comprising the steps of:

inputting an image signal;

converting the input image signal into the control signal such that if the dots formed along the array direction are classified into a plurality of groups depending on the plurality of times, an existing ratio of dots of a smaller one of the at least two sizes is higher for one of the groups of an earlier time of the times; and controlling the dot forming elements based on the converted control signal.

* * * * *